(12) United States Patent
Ferguson

(10) Patent No.: US 6,990,246 B1
(45) Date of Patent: Jan. 24, 2006

(54) IMAGE CODING

(75) Inventor: Keith Lamont Ferguson, Manchester (GB)

(73) Assignee: VICS Limited, Manchester (GB)

( * ) Notice: Subject to any disclaimer, the term of this patent is extended or adjusted under 35 U.S.C. 154(b) by 741 days.

(21) Appl. No.: 10/069,646

(22) PCT Filed: Aug. 17, 2000

(86) PCT No.: PCT/GB00/03156

§ 371 (c)(1),
(2), (4) Date: May 13, 2002

(87) PCT Pub. No.: WO01/15457

PCT Pub. Date: Mar. 1, 2001

(30) Foreign Application Priority Data

Aug. 21, 1999 (GB) .................................... 9919805

(51) Int. Cl.
*G06K 9/46* (2006.01)
(52) U.S. Cl. ...................... 382/240; 382/232; 382/233; 382/236
(58) Field of Classification Search ................ 382/240, 382/248, 239, 281, 206, 233, 232, 236; 358/1.9; 375/240.01, 240.16; 348/390.1, 423.1
See application file for complete search history.

(56) References Cited

U.S. PATENT DOCUMENTS 5,063,444 A * 11/1991 Knauer et al. ......... 375/240.11
5,315,670 A * 5/1994 Shapiro ...................... 382/240
5,321,776 A * 6/1994 Shapiro ...................... 382/240

FOREIGN PATENT DOCUMENTS

WO    WO 99/16250    * 4/1999

OTHER PUBLICATIONS

Chaddha et al., "Scalable Compression Based on Tree Structured Vector Quantization of Perceptually Weighted Block, and Wavelet Transforms", IEEE International Conference on Image Processing, vol. 3, Oct. 1995, pp2. 89-92.*

* cited by examiner

*Primary Examiner*—Anh Hong Do
(74) *Attorney, Agent, or Firm*—Woodard, Emhardt, Moriarty, McNett & Henry LLP

(57) ABSTRACT

An image coding method comprising generating an ordered sequence of coded image data, the sequence beginning with coded data representative of an area of the image having high importance, and ending with coded data representative of an area of the image having lower importance.

75 Claims, 12 Drawing Sheets

× N=8x8 neurons; ▲ N=16x16 neurons; ■ N=32x32 neurons; ● N=64x64 neurons.

✕ extended algorithm – first sequence; ▲ basic method – first sequence;
■ extended algorithm – second sequence; ◆ basic algorithm – second sequence.

✕ extended algorithm – first sequence; ▲ basic method – first sequence;
■ extended algorithm – second sequence; ◆ basic algorithm – second sequence.

✕ extended algorithm – first sequence;  ▲ basic method – first sequence;
■ extended algorithm – second sequence;  ◆ basic algorithm – second sequence.

IMAGE CODING

The present invention relates to a method of image coding. The method may be applied to, but is not limited to, coding of a series of video frames (where the term video refers to temporally separated images).

A primary problem addressed by video coding is how to reduce the number of bits needed to represent video frames. This problem arises in communications applications as a result of bandwidth restriction of communications systems, and arises in storage applications from limited storage capacity of storage media. A quarter common interchange format (QCIF–176×144 pixels) colour video stream comprises 25 frames per second (25 fps), each pixel of the frame being represented by 8 bits (8 bpp). Transmission of a QCIF colour video stream would require a communications bandwidth of ~14.5M bits/s. A 1 hour recording of a QCIF colour video stream would require ~6.4 G Bytes of storage. There are many applications in which the available bandwidth or available storage capacity is orders of magnitude less than these values.

The development of a video coding method capable of coding video frames using small amounts of data is of considerable commercial importance. In particular, there is a demand for a video coding method capable of coding video frames for transmission by a low-bandwidth communication channel. Low bandwidth is defined here as a bandwidth of 64 kbits/s or less (this corresponds to an ISDN basic rate channel). Other low bandwidths for which video coding methods are required include 28.8k bits/s, which is typically utilised by computer modems, and 9600k bits/s or less which is used for mobile telephony applications. A video coding method must compress video frames to an extreme degree in order to transmit the video frames over a low bandwidth communications channel. For example, for a 64k bits/s channel the QCIF colour video stream requires an average compression ratio of 232:1, a 28.8k bits/s channel requires 528:1 and a 10k bits/s channel, 1485:1.

Video frames contain a considerable amount of redundant information, for example an unchanging background. Redundancy of this type is known as objective information redundancy. Existing video coding methods take advantage of objective information redundancy to reduce the number of bits needed to represent video frames. An efficient video coding method should convert video frames to a representation in which a minimal amount of information may be used to exactly reconstruct the video frames, with any objective information redundancy being removed from the representation.

Where a low-bandwidth communication channel is to be used (i.e. 64 kbits/s or less), or a low capacity storage medium is to be used, information other than objectively redundant information is removed from representations of video frames. This will inevitably lead to degradation of the reconstructed image frames; there is an unavoidable trade-off between distortion and bit rate. The problem addressed by low bit-rate video coding methods is how to minimise distortion, and where there is distortion make that distortion as acceptable as possible.

Popular video compression methods are derivatives of one another including MPEG-1, MPEG-2, H.261, H.263 [H.261: 'ITU-T Recommendation H.261, video codec for audiovisual services at p×64 kbit/s', Geneva, 1990; H.263: 'ITU-T Recommendation H.263, video coding for low bit rate communication', February 1998; MPEG-1: 'Coding of moving pictures and associated audio for digital storage media at up to about 1.5 Mbit/s', ISO/IEC 11172-2 Video, November 1991; MPEG-2: 'Generic coding of moving pictures and associated audio information', ISO/IEC 13818-2 Video, Draft International Standard, November 1994]. These methods operate in the spatial domain, and include motion compensation and a first-order coding loop (i.e. differences between successive images are coded). Discrete cosine transforms (DCT) of difference images are uniformly quantised and then entropy coded. The resulting bit stream is of variable length. Where a communications channel operates at a constant bit rate (as is conventional), a buffer is used to decouple the bit stream from the communications channel. The average bit rate from the algorithm is maintained at the channel bit rate by regulating the scalar quantisation of the difference image DCT coefficients, coarser quantisation providing higher distortion but lower bit rates. The number of bits generated cannot be accurately predicted, and this is why a buffer is needed to maintain an average bit rate. Where a drastic correction of the bit rate is required, the frame rate is instantaneously decreased. The channel buffer introduces a delay which becomes significant at very low bit-rates on narrow bandwidth channels.

Existing very low bit rate (VLBR) video coding methods are currently formulated around extensions of the H.263 algorithm that also forms the basis for the MPEG-4 type algorithms. [H.263: 'ITU-T Recommendation H.263, video coding for low bit rate communication', February 1998; MPEG-4: 'MPEG-4 video verification model version-11', ISO/IEC JTC1/SC29/WG11, N2171, Tokyo, March 1998]. The H.263 coding algorithm is designed to operate over fixed copper land lines with a 28.8 kbits/s modem. These channels are assumed to be error free and are assumed to have a constant bandwidth.

With the growth of the Internet and mobile telephone markets there is a demand to deliver 'live' video content over channels that have significantly different channel characteristics compared to fixed copper land lines. The Internet has a very wide effective bandwidth dynamic range from a few hundred bytes/s to several kilo bytes/s. This bandwidth may change instantaneously. Third generation (3G) mobile telephones operate with a broadband Code Division Multiplex Access (CDMA) system which has a bandwidth that may change instantaneously. Typically, changes of effective bandwidth are caused by increased congestion or increased bit error rates.

Existing video coding methods developed for the Internet and mobile telephone systems comprise adaptations of the H.263 algorithm. These methods suffer from the disadvantage that they require a channel buffer, and therefore include a delay which affects 'live' transmission of video and in particular live two-way communication. The buffer also affects the ability of the methods to respond to instantaneously changing channel bandwidths. A further disadvantage of video coding methods based upon the H.263 algorithm is that they cannot deliver information at a continuously variable bit rate, but instead jump between different bit rates in coarse steps, typically by varying the number of frames per second. Where there are many differences between images, for example if a fast moving object crosses the image, then the frame rate may drop as low as one frame per second, and the sense of motion of a decoded image is lost.

Subsequently decoding the coded data by adding the coded data to a reference image in a coding loop, wherein when a coded image has been coded to a lower resolution than an immediately preceding image, on adding the coded image to the reference image during decoding, artefacts at high resolution in the reference image are removed by setting the higher resolution data to zero so that the resolution of the reference image corresponds to the resolution of the coded image.

Preferably, the importance of the image areas represented by the coded data decreases gradually over the ordered sequence.

Preferably, the image data coding sequence is arranged in a substantially spiral configuration centred on the area of importance.

Preferably, the area of importance is at a location selected as the most likely centre point of foveated vision of a viewer of the image.

Preferably, the area of importance is at a centre point of the image.

Preferably, the method includes converting an image into a multi-resolution representation, different resolution representations of the image being coded in sequence, the order of the sequence being determined to reflect psychophysical aspects of human vision.

Preferably, according to the sequence a luminance representation of the image is coded before chrominance representations of the image.

Preferably, for a given level of resolution, the luminance representation is arranged to include more resolution than the chrominance representations.

Preferably, the multi-resolution representation is generated using a wavelet transform, and the coding sequence comprises wavelet representation of the image which increase from a low level of resolution to a high level of resolution.

Preferably, wavelet orientations of horizontal and vertical image components are coded before wavelet orientations of diagonal image components.

Preferably, wavelet orientations of diagonal image components of a given level of resolution are coded after wavelet orientations of horizontal and vertical image components of a higher resolution.

Preferably, the method is implemented as part of a communications system, and the amount of coded information output by the method for a given image is determined on an image by image basis in accordance with the available bandwidth of the communications system.

Preferably, where necessary in order to fully utilise the available bandwidth of the communications system includes a truncated sequence of coded image data, image data representative of areas of least importance having been excluded from the truncated sequence.

Preferably, a predetermined code is added to a sequence to indicate the end of image data representative of a particular aspect of the image.

Preferably, the image is one of a sequence of images, the image is compared to a reference image determined using preceding images of the sequence, and the coding method is used to code differences between the image and the reference image.

Preferably, scalar quantisation is used to minimise the amount of image data to be coded, the scalar quantisation being based upon a psychophysical model.

Preferably, the method includes an estimation of motion within an image as compared with a reference image, and the estimated motion is included in the coded image data.

Preferably, the method includes a choice between image data that has been coded using motion estimation and data that has been coded without using motion estimation, the choice being made upon the basis of minimising distortion of the coded image.

Preferably, the method includes vector quantisation of the image, the vector quantisation being implemented using a self organising neural map to provide image data in the form of indices of a codebook.

Preferably, a threshold is applied to the magnitude of wavelet coefficients, and those which fall below the threshold are converted to zero coefficients.

Preferably, different codebooks are used for different sub-bands of the wavelet representation of the image.

Preferably, the indices of the codebook are subsequently coded using variable length entropy coding.

Preferably, a series of zero indices followed by a non-zero index is coded as a pair of values by the variable length entropy coding, a first value representing the number of zero indices in the series and the second value representing the value of the non-zero index.

Preferably, a threshold is applied to the indices of the codebook, and those indices which fall below the threshold are converted to zero indices.

Preferably, wavelet coefficients which fall above the threshold are reduced by the value of the threshold.

Preferably, the invention further comprises a method of decoding an image coded as described above, wherein where a truncated sequence of coded image data is received, the decoder decodes the image using the truncated sequence of coded image data and uses zero values in place of missing coded image data.

Preferably, the coded image is a difference image which is added to a reference image to generate a decoded image, and artefacts at higher resolutions of the decoded image caused by the truncated sequence are removed by setting the higher resolution data to zero.

A specific embodiment of the invention will now be described by way of example only, with reference to the accompanying drawings in which.

The method converts images (frames) of a video sequence to a coded representation.

The method is arranged to code the images at a desired rate, so that coded images are output by the method at a required frame rate. Each frame in a video sequence is presented to an input at the required frame rate. The method operates in a first order coding loop where only the instantaneous first derivative of the information is coded.

$$f'(z) = f(z)(1 - z^{-1})$$

In other words, an image to be coded is compared with a reference image, and differences between the images are coded. The efficiency of the coding loop relies on temporal redundancy between images in a sequence. Higher frame rates have greater temporal redundancy than lower rates for the. same change of viewing scene, and the use of a first order coding loop is suited to frame rates of 2 frames/s or more.

A basic embodiment of the method is described, followed by an extended embodiment of the method which includes motion compensation.

Figure 1:
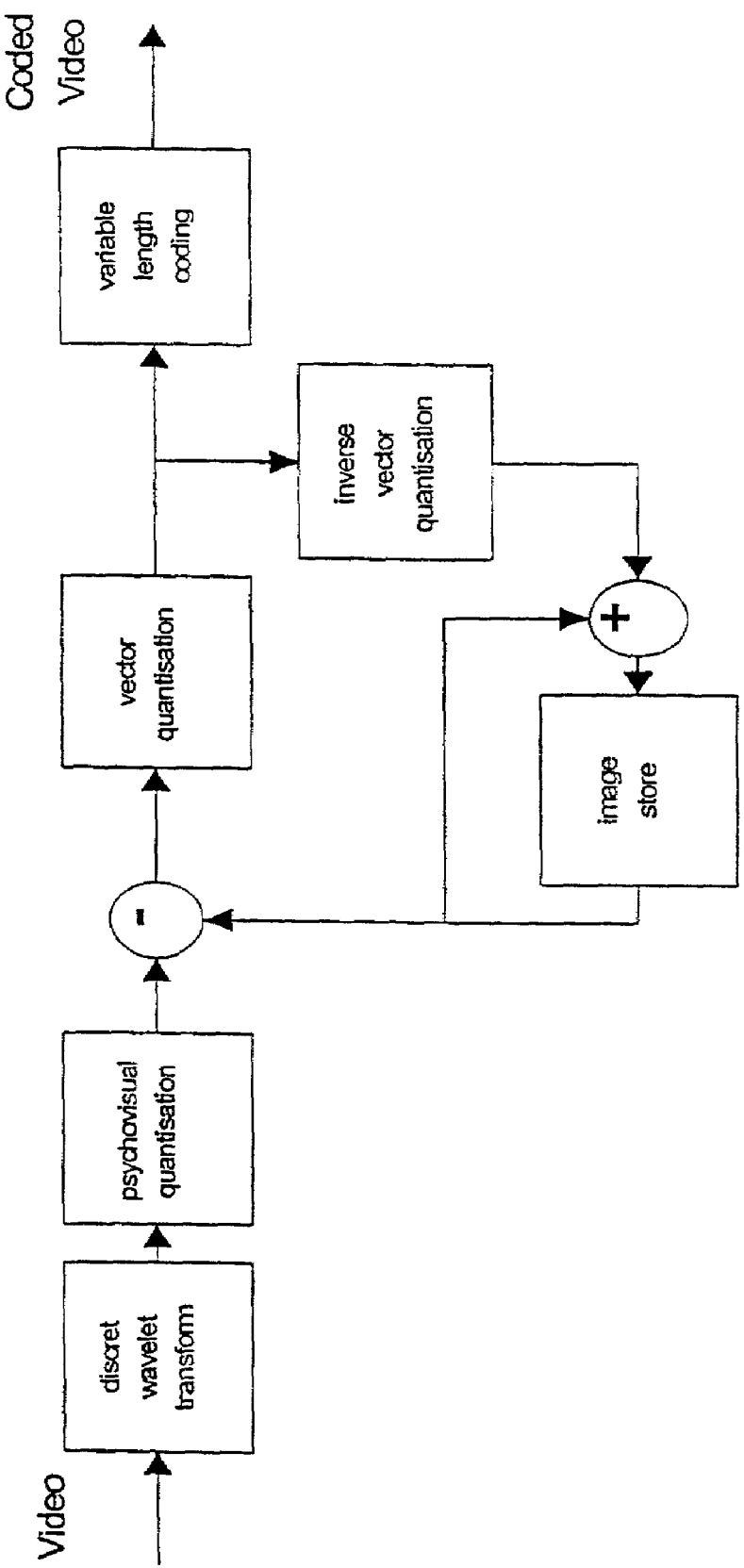
FIG. 1 is a block diagram representing a basic embodiment of the method.

A block diagram of the basic method is shown in FIG. 1. An image to be coded is first transformed to a discrete wavelet representation. Scalar quantisation is then used to remove redundant information from the input image. The quantisation is based upon a psychophysical model, and quantisation factors used are selected so that errors introduced by the quantisation are below a visibility threshold. Differences between the (transformed) image and a predicted reference image are determined, and a resulting difference image is vector quantised to generate a set of codebook indices. The codebook indices are represented by indices of a variable length entropy codebook.

Because the codebook indices are represented using a variable length entropy codebook, maximum objective information exploitation is achieved when the result of the image difference calculation produces small similar valued numbers. From a practical perspective this means mostly zeros and, if not zero as close to zero as possible. The efficiency of the method is therefore dependent to a large extent upon the input to the vector quantiser. The image difference calculation carried out prior to vector quantisation is 'encouraged' to produce small values by firstly stripping as much redundant information from the input image as possible (using the psychophysical quantisation step), and then secondly subtracting from it a best possible prediction of that input (i.e. the predicted reference image).

The method attempts to process images in a manner similar to the human visual system. This allows the method to maximise the removal of subjective information redundancy, i.e. information to which the human visual cortex does not respond. Such information is defined by non-conscious processing of the brain such as edge and texture separation, frequency sensitivity and masking effects. The term non-conscious is used here to differentiate it from the Freudian unconscious terminology.

From a simple model of the human visual system, the first area of subjective information redundancy exists in the eye's sensor mechanism. The eye is conditioned to be more sensitive to luminance information than chrominance. Therefore the method is provided with a front end (not shown in FIG. 1) which represents the images by separate luminance (Y) and chrominance (U and V) components, the chrominance spatial resolution being a factor of two less than the luminance resolution. The nomenclature for this colour space is represented by the ratios of the components as YUV 4:1:1.

The visual cortex is responsible for non-conscious processing of visual information presented to it by the eye's sensor mechanism. The visual information is separated into textures and edges of various orientations which are processed at differing resolutions. The method uses multiresolution wavelet transform because it simulates the way in which non-conscious vision processing is performed. The sensitivity of the cortex to sub-bands of the wavelet transformed image is not constant, i.e. the cortex is less sensitive to diagonal lines that it is to horizontal and vertical lines. The order in which the multiresolution wavelet transform is coded reflects this, with horizontal and vertical detail being given priority over diagonal detail.

The wavelet transform is implemented as a discrete wavelet transform (DWT) which sub-divides the image into octave sub-bands. The sub-division is carried out using a lifting technique with coefficients derived from 9-7 biorthogonal filter coefficients known to be suitable for image coding applications [Villasenor J. D., Belzer B., Liao J. *Wavelet Filter Evaluation for Image Compression.* IEEE Transactions on Image Processing, Vol. 4, No. 8, August 1995, pp. 1053–1060].

Any other suitable biorthogonal filter coefficients may be used. From an objective information redundancy viewpoint the choice of biorthogonal filter coefficients is important when producing image decompositions with the minimum number of significant valued coefficients. A discussion of how to chose appropriate biorthogonal filter coefficients is included in the paper by Villasenor, Belzer and Liao 1995 [see above].

The discrete wavelet transform is chosen in preference to a harmonic transform, such as a discrete cosine transform, because it is more suited to representing continuous-tone images composed mostly of large smooth areas and sharp edged boundaries, as is commonly seen in a video coding environment. Harmonic transforms are not suited to visual data of this sort, particularly at edges, because they produce many significant valued coefficients.

Referring again to FIG. 1, an input image following the DWT and psychophysical quantisation has a stored predicted reference DWT image subtracted from it on a wavelet coefficient by wavelet coefficient basis. A set of sub-band vector quantisers, one for each resolution level, orientation and colour component, is used to quantise the difference coefficient image. The bit rate is partially controlled by a parameter that thresholds the vector coefficients before quantisation. The codebook indices are entropy coded and therefore the output bit rate is dependent on the operational parameters of the vector quantiser. The operationally optimal vector quantiser for each sub-band is found by selecting the most suitable operating point on a distortion-rate function for that sub-band. Suitability is determined from both sub-space coverage and a practical entropy code perspective.

The method incorporates two cognitive factors. Firstly, in human vision objects are recognised as a whole before filling in detail, low resolution information being noted before high resolution information. For example, a person using video telephony will note a human head and shoulders before attempting to recognise an individual. Secondly, human vision tends to be foveated, i.e. the area of greatest visual sharpness is that point towards which the eyes are directed. This is especially true when tracking a moving object. For video telephony, it is most likely that a face will be focussed on and will usually be in the centre of the image. Therefore it is most profitable for coding of images to be centre biased. The method takes note of the above aspects of human vision by coding each difference frame vector from the lowest resolution DWT sub-band to the highest, in a spiral arrangement of wavelet coefficients which extends from the centre outwards within each sub-band. As mentioned above, luminance components are favoured over chrominance components.

Figure 2:
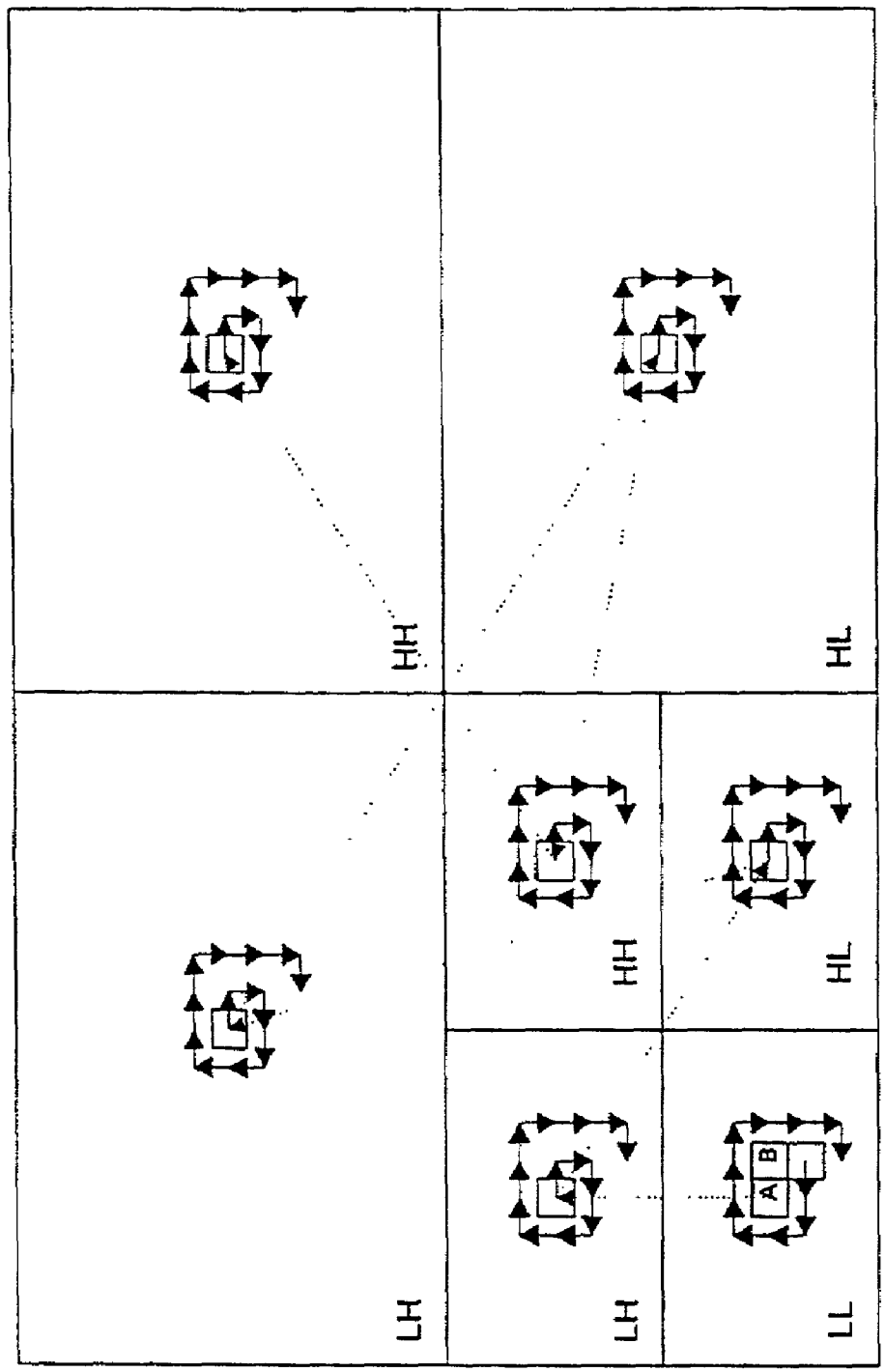
FIG. 2 is a schematic illustration showing the order in which wavelet coefficients are coded by the method.

FIG. 2 represents schematically the order in which wavelets of a difference image are vector quantised for a two level DWT decomposition, level 2 being a low level of detail and level 1 being a high level of detail. FIG. 2 is for illustrative purposes only, and it should be noted that the embodiment of the method uses a 4 level DWT decomposition. Referring to a lower left hand corner of FIG. 2, the method begins with the lowest level of detail (box labelled LL) of the difference image (level 2). This may be thought of as a thumbnail difference image. The method begins with four wavelet coefficients at a central point of the thumbnail difference image, as represented by a block labelled A in the centre of the box labelled LL. The wavelet coefficients are vector quantised by comparing them as a whole with a codebook specific to the LL sub-band, and allocating an index of the codebook to them (the index is a single number representative of the four wavelet coefficients). Four adjacent wavelet coefficients, as represented by a block labelled B are then vector quantised by comparing them with the codebook specific to the LL sub-band. The order in which wavelet coefficients are vector quantised is shown by the spiral arrangement of arrows in the box labelled LL. In this way, a series of codebook indices are generated in a sequence, the first few indices of the sequence representing wavelet coefficients of high importance (i.e. wavelets at or close to the centre of the image), and subsequent indices representing wavelet coefficients of gradually decreasing importance (i.e. wavelets at or close to edges of the image).

Following vector quantisation of the level 2 thumbnail difference image (LL), level 2 information representative of horizontal elements of the difference image (LH) is vector quantised. The vector quantisation is carried out for blocks of four wavelet coefficients, and is arranged in a spiral. Following vector quantisation of the LH difference image, level 2 information representative of vertical elements of the difference image is vector quantised in a similar manner.

Level 1 information representative of horizontal elements of the difference image (LH) is vector quantised in the same manner as described above (for blocks of four wavelet coefficients). The level 1 horizontal difference image (LH) is vector quantised before the level 2 diagonal difference image (HH), because the level 1 horizontal difference image information is considered to be more important from a psychophysical perspective (the human cortex is not as responsive to diagonal lines as it is to either horizontal or vertical).

Level 1 information representative of vertical elements of the difference image (HL) is vector quantised, followed by level 2 information representative of diagonal elements of the difference image (HH), followed by level 1 information representative of diagonal elements of the difference image (HH).

It should be noted that vector quantisation of the level 2 thumbnail difference image (LL) and each subsequent image is carried out first for wavelets representative of the luminance (Y) of the image, and then for wavelets representative of the two chrominance components (U and V) of the image.

The indices generated by the vector quantisation are coded in real time using variable length entropy coding, as represented in FIG. 1 (the method does not include a buffer). Coded information representative of the image begins with the most important information relating to the image, and decreases gradually to the least important information relating to the image.

The order in which coded information relating to an image is generated by the method is as follows: wavelet coefficients of a luminance (Y) representation of a level 4 thumbnail difference image (LL) starting at the centre of the thumbnail image and spiralling outwards (this is done for every difference image), wavelet coefficients of a first chrominance (U) representation of the level 4 thumbnail difference image (LL), wavelet coefficients of a second chrominance (V) representation of the level 4 thumbnail difference image (LL) (all difference images are represented separately as Y,U and V wavelet coefficients), level 4 horizontal information (LH) difference image, level 4 vertical information (HL) difference image, level 3 horizontal information (LH) difference image, level 3 vertical (HL) difference image, level 4 diagonal information (HH) difference image, level 2 horizontal information (LH) difference image, etc.

The majority of the wavelet coefficients for a given image will be zeros. This is especially true when differences between image frames are small, since the wavelet coefficients represent a difference image. Referring to FIG. 2, a block (i.e. vector) of four zero wavelet coefficients is termed a zero vector and is allocated an index of zero. Coding of vectors proceeds in sequence, counting the zero vectors until a non-zero vector is encountered (this is referred to as a zero run). The run of zero vectors and a codebook index representing the non-zero vector are entropy coded with respective codes. Thus, a difference image containing many zero vectors will be entropy coded with a small number of bits.

Where the method is used in a communications application, the importance of coded information arriving at a receiver will decrease gradually over time for a given image. This feature of the method provides a primary advantage, namely that the amount of information sent to a receiver can be adjusted to precisely match the bandwidth of a communications link. For a given bandwidth, coded information representative of an image which fills that bandwidth is transmitted across the communications link, and any further information is discarded.

If the number of bits generated by an entropy coded pair when added to the current running total of bits is less than the frame bit limit, then the two entropy codes are added to the bit stream. This process continues until the frame bit limit is reached, at which point no further bits are transmitted to a receiver. The bit limit will in general occur partway through coded information relating to a DWT difference image of a detail level (i.e. referring to FIG. 2, partway through a spiral).

Figure 3:
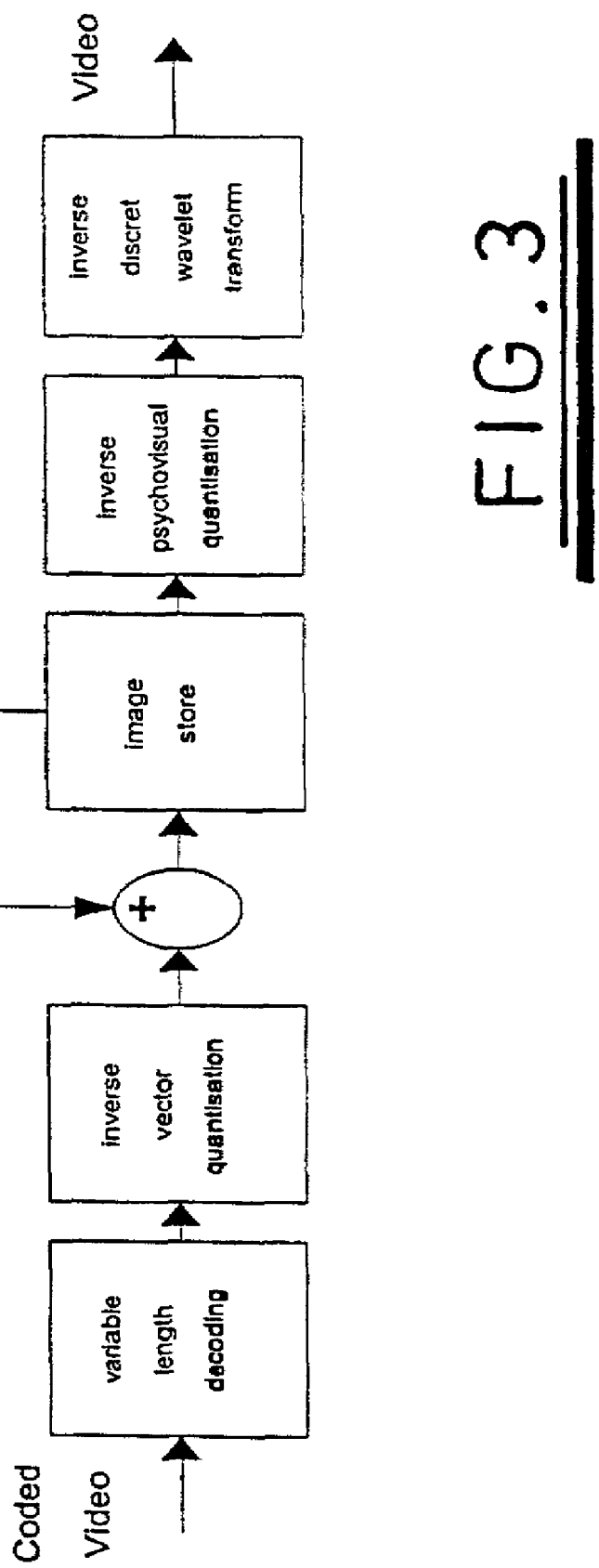
FIG. 3 is a schematic illustration showing the order in which an image coded using the method can subsequently be decoded.

A decoder will reconstruct an image using a method illustrated in FIG. 3, which includes the inverse of the variable length encoder and the feedback loop of FIG. 1.

The image is reconstructed in the same order in which it was coded, i.e. beginning with the most important information and adding detail of gradually decreasing importance. Thus, where the bandwidth of a communications link is very low, the level of detail of the reconstructed image will be correspondingly low but the psychovisually most important parts of the image will be present in the reconstructed image. All of the information received at the decoder, including code immediately preceding the bit limit for a given image (i.e. referring to FIG. 2, part of a spiral) is used by the decoder to reconstruct the image.

All vectors greater than the bit limit are assumed to be zero by the decoder.

The method is particularly applicable to communications links in which the bandwidth varies continually and over a wide range, for example the internet. The entire bandwidth available at any given time (or a selected portion of the bandwidth) is used to transmit coded image information. Known prior art coding methods are not capable of being used in this way.

'End-of-sub-band' and 'end-of-image' markers are included for bit stream synchronisation. 'End-of-sub-band' markers allow the receiver to partially decode the bit stream such that a 'thumbnail' representation (lower resolution) of the image may be viewed during reception. This is particularly useful for monitoring communications sessions or scanning stored video databases.

Artefacts may be generated by the coding method as a result of producing coded vectors of variable length, per frame in the ordered sequence. During periods of low temporal activity the ordered vector sequence will reach high resolution sub-bands of the wavelet representation without exceeding the number of bits allowed to code that frame (the number of bits may for example be determined by the bandwidth of the communication link). If this is followed by a burst of temporal activity, then the ordered sequence of coded information will reach only low resolution wavelet sub-bands (for a communication link of the same bandwidth), and will implicitly code zero change in higher wavelet sub-bands. The visual effect of the temporal activity will be to leave motionless high frequency edge components superimposed on the moving image. This artefact is referred to as the 'shower door' effect. To alleviate the effect, the high resolution sub-band vectors in the decoded image are set to zero by the decoder from the centre out. The decoder will set to zero any vectors that are not coded for a current image and which were coded in a preceding image. Thus, the vectors are set to zero for increasing resolutions from the centre of the image outwards, until the foveated point reached by the last coded sub-band of the preceding image. To allow for differing vector dimensions in each sub-band (i.e. referring to FIG. 2, different sizes of blocks), the foveated point is calculated as a fraction of the sub-band ordered sequence.

The extended embodiment of the method includes motion compensation. Motion compensation is used to reduce the amount of information in the difference image for more efficient coding. The motion compensation tracks spatial translational motion between images in the video sequence. DWT domain motion compensation has some advantages over the spatial domain motion compensation (for example as used by the H263 algorithm), in terms of the visual artefacts generated in those cases where the approximation error is large. Spatial domain motion compensation produces annoying blocking effects, whereas less objectionable speckled noise is produced from DWT domain compensation.

Figure 4:
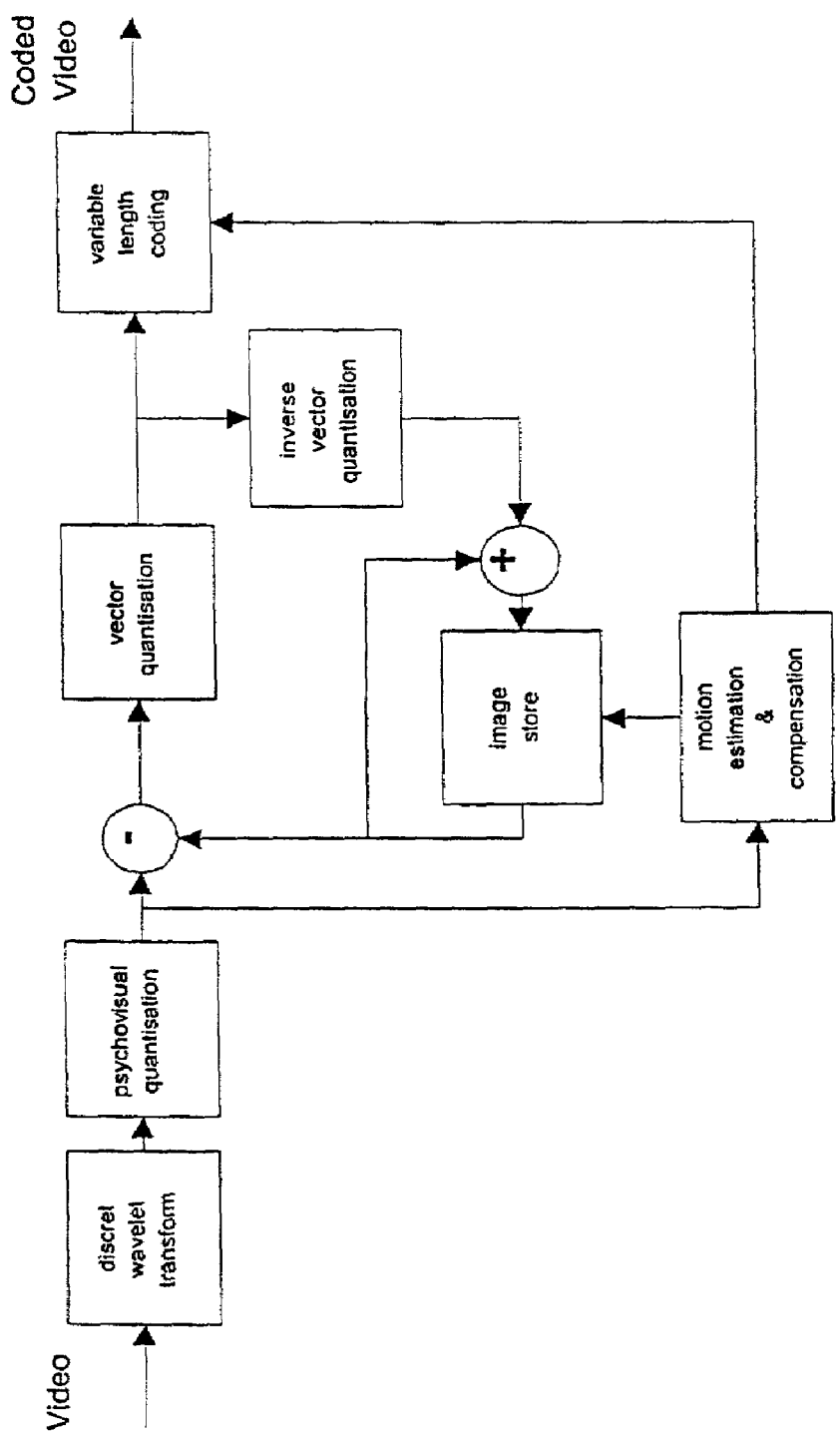
FIG. 4 is a block diagram representing an extended embodiment of the method, which includes motion compensation.

A block diagram of the extended method is shown in FIG. 4. The basic principle of the DWT domain motion estimation and compensation proceeds in the following manner. After the subjective information has been removed from the current DWT domain image (psychophysical quantisation), motion is estimated with each two-dimensional block of spatially corresponding coefficients within each sub-band and colour component (chrominance estimation is optional) of a stored reference image. Within each sub-band the block dimension (i.e. the number of wavelet coefficients to which vector quantisation is applied to generate a single index) is chosen to be the same as the block dimension of the corresponding vector quantiser (see FIG. 2), to allow the foveated sequence to proceed on a block-by-block basis without overlap. Extending the sub-band boundaries with zero valued coefficients permits motion vectors from outside the sub-band. This increases the estimation accuracy for the boundary blocks. Half-pixel estimation is performed and the best mean square error (MSE) matching block is written into the reference image to provide a motion compensated reference image. The compensated reference image is then subtracted from the input image and is vector quantised. The estimated motion vectors are coded directly using variable length coding as shown in FIG. 4.

Examples of block based motion estimation and compensation which could be used are as follows:

1. Apply the inverse DWT within the coding loop and motion estimate and compensate in the spatial domain. This approach ensures the maximum motion accuracy but increases the coding complexity [Nosratinia A., Orchard M. T. A *Multi-Resolution Framework for Backward Motion Compensation.* SPIE Proceedings on Digital Video Compression: Algorithms and Technologies, Vol. 2419, 1995, pp. 190–200].

2. Motion estimate and compensate within the DWT domain and accept the accuracy limitations at each level [Zhang Y. Q., Zafar S. *Motion-Compensated Wavelet Transform Coding for Color Video Compression.* IEEE Transactions on Circuits and Systems for Video Technology, Vol. 2, No. 3, September 1992, pp. 285–296]. If the MSE of a motion compensated block is greater than that of some weighted value of the pixel energy then, no motion vector is coded [Mandal M. K., Panchanathan S. *Motion Estimation Techniques for a Wavelet-based Video Coder.* SPIE Proceedings on Digital Video Compression: Algorithms and Technologies, Vol. 2668, 1996, pp. 122–128]. This limits the estimate inaccuracy from increasing the bit rate.

In both approaches advantage may be taken of the multiresolution structure of the DWT for inter level prediction to reduce the general multiresolution redundancy in natural images and reduce the coding complexity. However the partial inverse DWT may be required for the estimation process because there is no direct evidence that the coefficients at lower level sub-bands may be predicted from the higher levels without using the reconstructed LxLy sub-bands.

There is generally little motion between consecutive frames in a video sequence particularly in the background. Therefore zero motion vectors will be statistically most likely. The motion vector foveated sequence is coded in a similar manner to the zero run length encoding of vectors applied to the indices of the vector quantisers. For each non-zero motion vector in the sequence, a zero run length and the two motion vector components are entropy coded and added to the output bit stream provided the frame bit limit is not exceeded.

The zero run length encoding of the motion vectors is particularly important for very low bit rate video coding algorithms where an added bit overhead could offset the quality gained by motion compensation. For small movement within video scenes, as is possible in video telephony, many zero and small valued motion vectors will consume scarce bit resources. An added problem with block motion estimation is that it is possible for the compensated block to produce greater difference image energy than without compensation (i.e. more information is required to be coded). An uncompensated reference image block is equivalent to a compensated block with a zero motion vector. Therefore to improve the predicted reference image and to 'encourage' the zero motion vector for coding efficiency, a 'best choice' algorithm is used.

Figure 5:
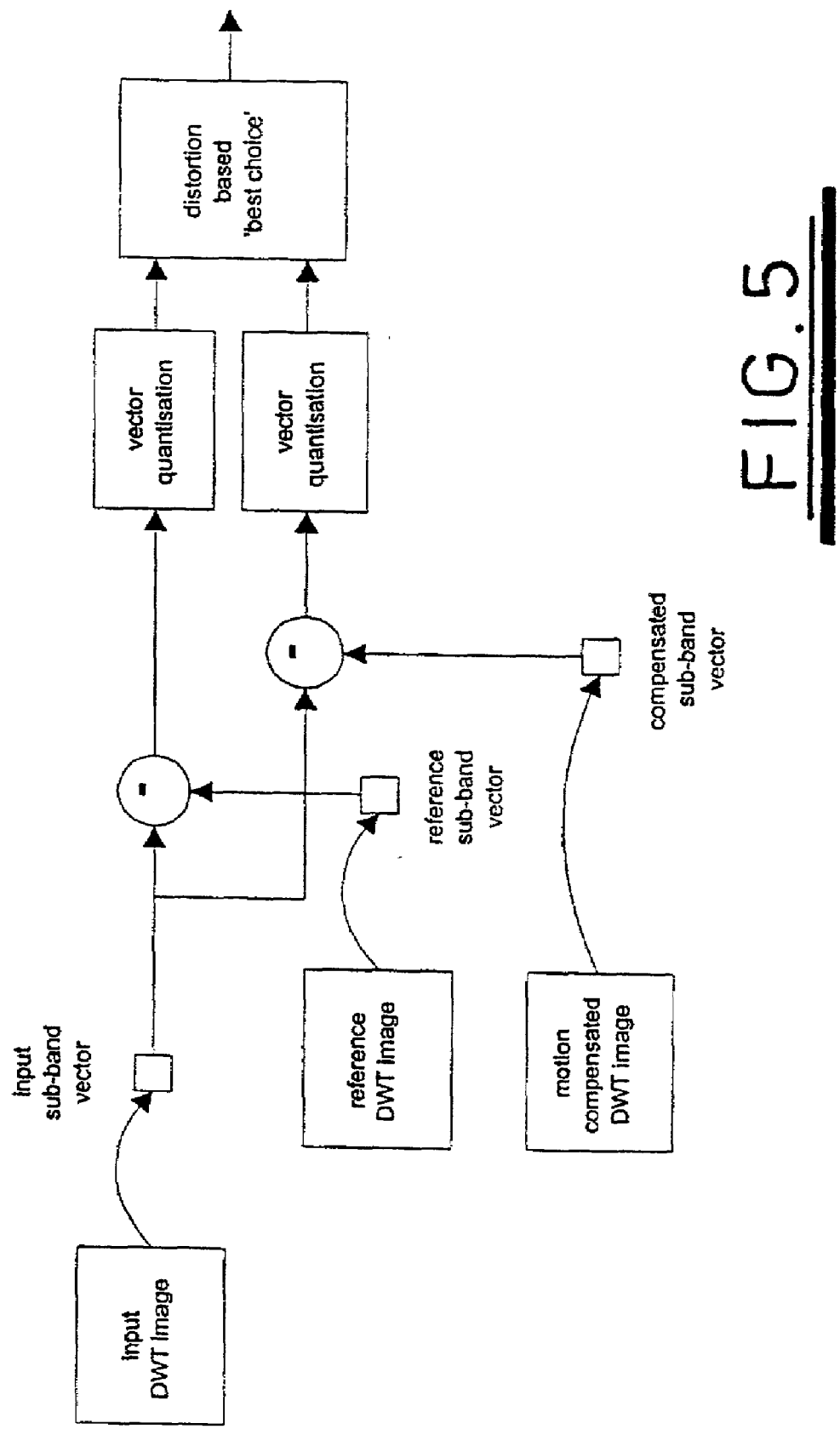
FIG. 5 is a block diagram representing choice between the basic embodiment of the method and the extended embodiment of the method.

The 'best choice' algorithm is implemented in a block mean-square error (MSE) sense. The basis of the choice is determined by vector quantising the difference image blocks from both the motion compensated and uncompensated images and choosing the vector quantised block with the lowest quantisation error. If the uncompensated block is chosen, then the zero vector is associated with it. The process is diagrammatically illustrated in FIG. 5.

The decoder does not require any knowledge of the choice between the uncompensated block and compensated block, since the zero vector implicitly refers to an uncompensated block.

The 'best choice' algorithm with run length coding of the zero motion vectors ensures a minimal bit cost for both low temporal activity and high temporal activity.

Several parts of the method are described in more detail below, followed by examples of the method in use.

Psychophysical quantisation of an image, as represented in FIGS. 1 and 4 is described in the following paragraphs. The psychophysical quantisation uses scalar quantisation. As mentioned above, the goal of psychophysical quantisation is to remove from the image subjective information redundancy. The degree to which spatial frequency representations of images may be shaped depends on the frequencies observed by a human viewer.

The two-dimensional DWT used here by the method consists of a frequency and orientation sub-division process. The multiresolution filtering and sub-sampling in the horizontal and vertical directions divides the signal into octave frequency sub-bands with horizontal, vertical and diagonal orientations. The DWT process may therefore be considered as a discrete approximation to the physiological process that takes place in the model for the human visual cortex [Mallat S. G. *Multifrequency Channel Decompositions of Images and Wavelet Models.* IEEE Transactions on Acoustics, Speech, and Signal Processing, Vol. 37, No. 12, December 1989, pp. 2091–2110].

The embodiment of the method uses an efficient quantisation strategy developed to take advantage of the modelled physiological processing of the human visual cortex. The visibility of quantisation errors for all colour components at all DWT levels and orientations has been determined from a set of subjective experiments [Watson A. B., Yang G. Y., Solomon J. A., Villasenor J. *Visual Thresholds for Wavelet Quantization Error.* SPIE Proceedings on Human Vision and Electronic Imaging, B. Rogowitz and J. Allebach, Editors., Vol. 2657, Paper No. 44, 1996]. Using this information, a psychophysical model customised for the two-dimensional DWT coefficients is established. The resulting fitted model for the threshold of visibility, T, as a function of spatial frequency, f, and orientation, o, is as follows:

$$T(f, o) = a \cdot 10^{k\left(\log \frac{f}{g_o f_0}\right)^2}$$

The approximated model parameters are given in Table 1.

TABLE 1

| | Threshold Model Parameters | | | | | | |
|---|---|---|---|---|---|---|---|
| Colour | a | k | $f_0$ | $g_{LxLy}$ | $g_{LxHy}$ | $g_{HxLy}$ | $g_{HxHy}$ |
| Y | 0.495 | 0.466 | 0.401 | 1.501 | 1.0 | 1.0 | 0.534 |
| U | 1.633 | 0.353 | 0.209 | 1.520 | 1.0 | 1.0 | 0.502 |
| V | 0.944 | 0.521 | 0.404 | 1.868 | 1.0 | 1.0 | 0.516 |

The successive application of the DWT at each level, 1, results in halving of the sub-band frequency bandwidth. For a display with a maximum spatial frequency of $f_{max}$:

$$BW_l = f_{max} 2^{-l} [cpd]$$

where cpd indicates cycles per degree of the viewer's vision (this depends upon the size of the decoded image and the distance of the viewer from the decoded image). The centre frequency of each sub-band is used as the nominal frequency for the development of the quantisation process.

$$f_{l,c} = 3 f_{max} 2^{-(l+1)} [cpd]$$

Figure 6:
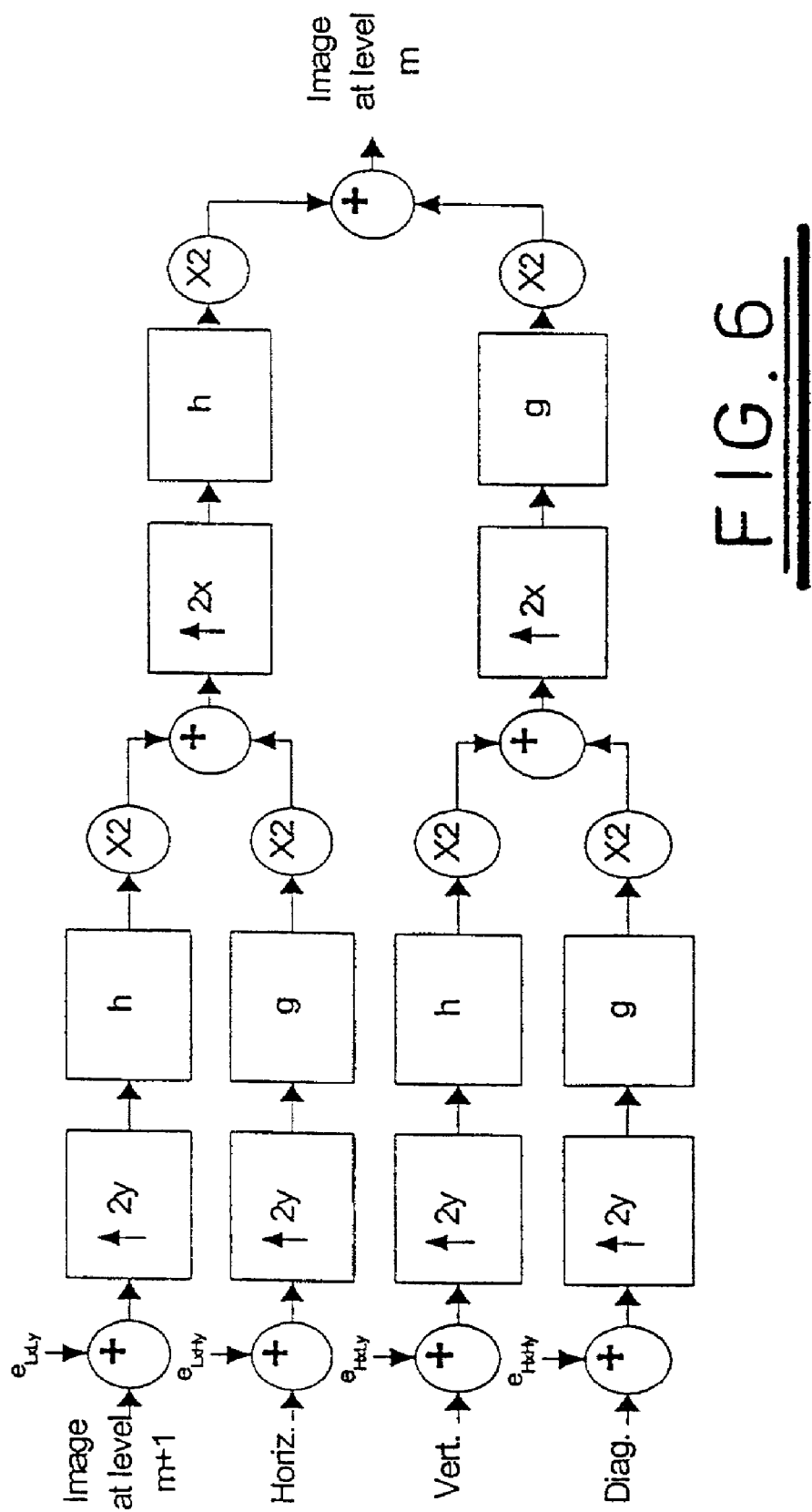
FIG. 6 is a schematic diagram representing a two dimensional inverse transform, used to predict quantisation errors.

The visibility of quantisation errors introduced at a particular level and orientation may be approximated by the amplitude of the DWT synthesis filters for that level and orientation. This approximation is implementation and filter bank dependent. The introduction of quantisation errors at level (m+1) for an inverse DWT process is shown in FIG. 6.

Each sub-band is up-sampled by two in the vertical direction, then a convolution is performed with the relevant one-dimensional synthesis filter, multiplied by a factor of two and summed to form vertical groups. The vertical groups are similarly up-sampled followed by the convolution, multiplication by two and summed, but in the horizontal direction. The resulting effect on the image at level 'm' is then propagated through the remaining image levels to the reconstructed image. Considering only the most significant term of the linear convolution process approximates the amplitude of the error per level. For example, the effect of an error in a low-pass horizontal and a high-pass vertical orientation (LxHy) at one level may be approximated as follows, for the next level.

$$E_{LxHy} = |(e_{LxHy} * g * h) 2^2| \approx 2^2 |e_{LxHy} g_0 h_0|$$

Therefore the effect of an error at level m for each orientation, on the entire reconstructed image may be written as:

$$E_{m,LxLy} \approx 2^{2m} |e_{m,LxLy} h_0^{2m}|,$$

$$E_{m,LxHy} \approx 2^{2m} |e_{m,LxHy} g_0 h_0 h_0^{2(m-1)}|,$$

$$E_{m,HxLy} \approx 2^{2m} |e_{m,HxLy} h_0 g_0 h_0^{2(m-1)}|,$$

-continued and, $$E_{m,HxHy} \approx 2^{2m}|e_{m,HxHy}g_0^2 h_0^{2(m-1)}|.$$

A biorthogonal wavelet filter bank that performs well for image compression applications, is the spline-based set with filter coefficient lengths of nine and seven [Villasenor et al, see above]. The approximate amplitudes of error visibility for this filter bank with a root-two bias as required for the inverse DWT described above, to four levels and all orientations of the DWT process are given in Table 2.

TABLE 2

Quantisation Error Visibility to DWT Level 4

| Orientation | Level | | | |
|---|---|---|---|---|
| | 1 | 2 | 3 | 4 |
| LxLy | 1.2430 | 1.5461 | 1.9224 | 2.3904 |
| LxHy | 1.3447 | 1.6720 | 2.0790 | 2.5851 |
| HxLy | 1.3447 | 1.6720 | 2.0790 | 2.5851 |
| HxHy | 1.4542 | 1.8082 | 2.2483 | 2.7956 |

A quantisation factor is required for each colour and sub-band such that the resulting quantisation error is below the visibility threshold. For a linear quantiser with a factor of Q, the worst case error is Q/2. Therefore the quantisation strategy used by the method for the psychophysical scalar quantisation is:

$$T(f, o) = V(l, o)\frac{Q(l, o)}{2}$$

The quantisation visibility term, V is defined by the DWT process such as that given in Table 2. The operational quantisation factors used by the method are formed as follows:

$$Q(l, o) = \frac{2}{V(l, o)}T(f, o)$$

$$Q(l, o) = \frac{2}{V(l, o)}a.10^{k\left(\log\frac{f_{1,c}}{g_o f_0}\right)^2}$$

$$Q(l, o) = \frac{2}{V(l, o)}a.10^{k\left(\log\frac{3f_{max}}{2^{(l+1)}g_o f_0}\right)^2}$$

where V(l, o) refers to the level and orientation error visibility values set out in table 2.

The quantisation factors provide an overall shape that may be applied to the DWT coefficients of an image to achieve an imperceptible difference with the original image. For low bit rate applications where greater quality loss is tolerated, the quantisation shape is uniformly scaled to ensure that the largest errors are confined to the least responsive regions of the human psychophysical system.

Referring to FIG. 1 and FIG. 4, psychophysical scalar quantisation (as described above) is followed by the generation of a difference image. Vector quantisation is then applied to the difference image. The following paragraphs describe the vector quantisation of the difference image. The method uses a self organising neural map (SOM) which through the use of training images provides a solution to the problem of how to apply vector quantisation efficiently.

The generation of a vector quantiser solution requires formulating a cost function to be minimised and describing the conditions of optimality for that cost function. General vector quantisation theory is discussed herein to lay a foundation for showing how the trained SOM used by the method achieves the same optimal solution. A noise model of the vector quantiser produces a similar gradient descent training algorithm as that of the SOM. Operationally optimal vector quantisers for a signal compression environment may be found by varying the entropy of the SOM. The entropy is approximated as a rate-constraint and results in a natural extension to the SOM training algorithm.

Figure 7:
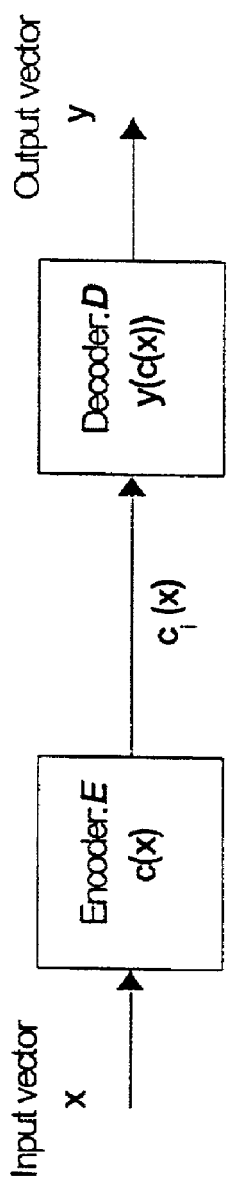
FIG. 7 is a schematic representation of general vector quantisation encoding.

A basic encoder-decoder model for a vector quantiser is shown in FIG. 7 [Gersho A., Gray R. M. *Vector Ouantization and Signal Compression.* Kluwer Academic Publishers, Boston, 1992]. The processes discussed in the prior art all assume a high resolution case where the number of codewords, N, is very large i.e. N→∞.

The vector quantisation problem may be considered as an optimal approximation process of an input space to an output space that, in the case of signal compression, is itself a subset of the input space. A vector, x, of dimension k from the input space, $X^k$, (where X∈R, the set of real numbers) is the input to the encoder. The encoder maps the input space to a codebook C that consists of N codewords. The encoding process may be written as: E: $X^k$→C where C=$\{c_i(x)\}_{i\in I}$. The process is fully defined by either the index into the codebook, i∈I, or the codeword itself, $c_i(x)$, and therefore it is usual for only the index, or a symbolic representation thereof, to be transmitted on the communications channel to the decoder. The encoding process is the quantisation process that, in general, is lossy in that the codebook size is limited, |C|=max{i}=N <<∞. The decoder maps the codebook back into the input space and may be written as: D: C→$X^k$ where the reconstructed vector y∈$X^k$.

The compression mechanism of vector quantisation is achieved by the dimension reduction process from a vector in space $X^k$ to an integer index, i. The premises for the mechanism is that the signal space covered by x is a sub-space of $X^k$ and that it is a stationary random process with an underlying joint probability density function (pdf), f(x), such that f(x)→0 as x→+∞ defined as $\{x_1 \to \pm\infty, x_2 \to \pm\infty, \ldots, x_k \to \pm\infty\}$.

Generating optimal or near optimal vector quantisers for the signal sub-space is achieved by minimising a suitable cost function in a long term average sense where the cost function is itself defined as a stationary random process. If the cost function and the sub-space pdf are smooth functions, or may be approximated by smooth functions, and hence are differentiable everywhere, then gradient descent methods may be used to find near optimal solutions for sometimes intractable analytical solutions. The most common approach is to minimise the mean squared error (MSE) distortion in a Euclidean distance sense, because the performance of the resulting vector quantiser is usually measured by the MSE criterion. The function to minimise may be written as:

$$D = \int_{-\infty}^{+\infty} \|x - y\|^2 f(x) dx \quad x, y \in R^k$$

Here the $\|\cdot\|$ operator represents the Euclidean distance. The optimal solution to the minimisation of D with respect to y, requires the joint minimisation of the nearest-neighbour condition and the centroid condition.

The nearest-neighbour condition describes the optimal encoder given a fixed decoder. This condition results in the input space being partitioned into regions, $R_i$, which may be termed as k-dimensional "volumes of influence" of the fixed codewords, $c_i=y_i$, in the codebook, C. The optimal region partitions are such that:

$$R_i \subset \{x: \|x-c_1\|^2 \le \|x-c_j\|^2\} j=1 \ldots N$$

Therefore:

$$\|x-y\|^2 = \min_{c_i}\{\|x-c_i\|^2\}$$

The region is chosen to minimise the squared error distortion with the given codebook.

The centroid condition describes the optimal decoder given a fixed encoder. The distortion integral, D, may be rewritten as:

$$D = \sum_{i=1}^{N} \int_{R_i} \|x-c_i\|^2 f(x) dx$$
$$= \sum_{i=1}^{N} P_i \int \|x-c_i\|^2 f(x|x \in R_i) dx$$

Here $P_1$ is the probability that x is in $R_i$, $P_1=\text{Prob}[x \in R_1]$ and $f(x|x \in R_1)$ is the conditional pdf of $f(x)$ given that x lies in $R_i$. The fixed encoder implies that the regions, $R_1$, are fixed and therefore each conditional term may be separately minimised, provided that $P_1$ is non-zero. Therefore the centroid of region, $R_1$, is defined as that output vector, $y_1=c_1$, which minimises the distortion between itself and the input vector, x, where $x \in R_1$, over the entire conditional pdf.

$$y_i = \min_{y}^{-1} \left[ \int_{R_1} \|x-y\|^2 f(x|x \in R_1) dx \right]$$

Under the squared error distortion criterion the optimal solution is the centroid of each region.

$$y_i = \int_{R_i} x f(x|x \in R_i) dx$$

An iterative batch mode algorithm may be used to find an optimal or near-optimal solution to these two conditions for a given input distribution. The process involves finding an optimal region partition for a given codebook and then finding the optimal codebook for the given partitions. Many such algorithms and operational derivatives exist for this process [Linde Y., Buzo A., Gray R. M. *An Algorithm for Vector Quantizer Design*. IEEE Transactions on Communications, Vol. 28, January 1980, pp. 84–95; Gresho et al, see above].

Figure 8:
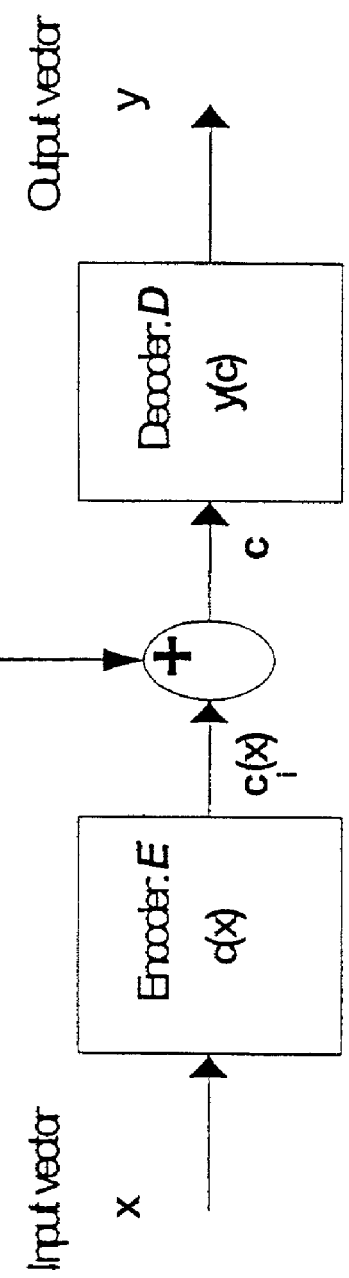
FIG. 8 is a schematic representation of general vector quantisation encoding including noise.

A vector quantiser noise model is now described. Consider the gradient descent training process of an optimal high resolution vector quantiser. During the early stages of the training process there is a large error between the input, x, and output, y. As the process continues and the global minimum is approached, the error decays to some small value, which, in the high resolution case, may be made arbitrarily small. If the error is assumed to be independent of the input, then it may be modelled by a smooth zero-mean Gaussian distributed random variable. The model in FIG. 7 may be modified to produce the noise model of a vector quantiser [Luttrell S. P. *Self-organization: A derivation from first principle of a class of learning algorithms*. IEEE Conference on Neural Networks, Washington, D.C., 1989, pp. 495–498] shown in FIG. 8.

For this model, the optimal vector quantiser for vectors, x, taken from a sample space defined by the underlying pdf, $f(x)$, in a squared error sense, is one that minimises the long term average distortion defined as:

$$D = \int_{-\infty}^{+\infty} \left[ \int_{-\infty}^{+\infty} \|x-y(c(x)+n)\|^2 \pi(n) dn \right] f(x) dx$$

Here $\pi(n)$ is the pdf of the additive noise. The optimal encoder for a given decoder then minimises the partial distortion measure:

$$pD_{c,x} = \int_{-\infty}^{+\infty} \|x-y(c(x)+n)\|^2 \pi(n) dn$$

For a given input vector, x, find the minimum distortion codeword, c(x), for all possible noise additions. The realisation of this equation may be simplified by assuming that $\pi(n)$ is smooth and the training, process is nearing completion, so $n \to 0$ and therefore $\pi(n) \to 1$. The minimum condition then reduces to the nearest-neighbour condition of the previous noiseless model. The best-matching codeword, c(x), from the vector quantiser codebook, C, may be completely defined by its index, $i \in \{1 \ldots N\}$, in the codebook (and vice versa).

$$i(x) = \min_{j}^{-1} \{\|x-y(c_j(x)+n)\|^2\}, \ j=1 \ldots N$$

The optimal decoder for a given encoder is found by minimising the distortion measure with respect to the output, y.

$$\frac{\partial D}{\partial y} = -2 \int_{-\infty}^{+\infty} [(x-y)\pi(n)] f(x) dx$$

Setting, to zero and solving results in the cenitroid condition that may be used in an iterative batch mode algorithm.

$$y = \frac{\int_{-\infty}^{+\infty} x \pi(n) f(x) dx}{\int_{-\infty}^{+\infty} \pi(n) f(x) dx}$$

However, a gradient descent algorithm for the decoder output vectors follows directly. Note that y is a function of c, and n=c−c(x). Therefore, randomly sampling the input space that has a distribution defined by the pdf, f(x), results in the following update step:

$$y_{1+t}(c_j)=y_t(c_j)+\eta_t \pi_t(c_j-c_t(x_t))[x_t-y_t(c_j)], j=1 \ldots N$$

Here $\eta_t$ is the adaptive learning rate parameter and $c_1(x_t)$ is defined by the best-matching codeword from the nearest-neighbour condition at iteration t. If a zero-mean Gaussian function for $\pi(n)$ is imposed on the learning process, then the codewords, $c_j$, centred on the best-matching codeword, $c_t(x_t)$, will be 'brought nearer' in a squared error sense, to the centre codeword. Furthermore, by imposing an initially large radius Gaussian function and then decreasing it to zero during the training process, will result in a topologically ordered codebook, C.

The stochastic gradient descent algorithm for the encoder-decoder noise model is the same as the standard SOM algorithm with neuron indices defined by i={1 ... N} and the neuron weights defined by $y_1$. The noise shape defines the neighbourhood function and ensures the topologically ordered property of the output space. Therefore the SOM algorithm will generate an optimal (or at least, near optimal) vector quantiser.

A rate-constrained self-organising neural map (SOM) is now described. Consider the application of a SOM trained as an optimal vector quantiser in a signal compression environment. The vector samples, x, are extracted from the signal and the index of the neuron whose weight vector has the lowest squared error distortion with x, is transmitted on the channel to the receiver. The receiver decodes the output vector, y, in a weight vector look-up table whose neuron index, i, is that received from the channel. Therefore the information conveyed over the communication channel is completely contained in the index. This raises the issue of efficient symbolic representation of the transmitted indices. Since only binary alphabet symbols are considered here, A∈{0, 1}, the index is represented by a variable length code, v(i), whose average bit rate is upper-bounded by the uniform neuron firing distribution case of $B=\log_2 N$ bits per vector. The bit rate or bit length of the code will be denoted by its magnitude, |v(i)|.

For any joint pdf f(x) of the input vector, x with dimension k, such that f(x)→0 as x→±∞, there exists an arbitrary low distortion SOM where N is finite and the neuron firing probabilities are described by a probability mass function (pmf), p(i(x)), such that p(i(x))∝f(x). This premise is based on the density matching properties of the trained SOM [Kohonen T. *Self-Organizing Maps*. Springer-Verlag, New York, $2^{nd}$ Edition, 1997; Haykin S. Neural Networks A Comprehensive Foundation. Macmillan College Publishing Company, New York, 1994]. An entropy coding method is therefore more efficient for transmitting the indices. From an information viewpoint the average entropy, in bits, is defined as:

$$H(i) = -\sum_{i=1}^{N} P_i \log_2 P_i$$

Here ∈ is the a posteriori probability of index, i being the winning neuron which is identical to the vector quantiser definition, $P_i$=Prob[x∈ $R_i$]. If a prefix-free variable length binary code is used and allowing non-integer code lengths, then the average length is the index entropy [Gresho et. al; see above]. Therefore the length of the code to represent the index, i, is defined as:

$$|v(i)|=-\log_2 P_i$$

Note that practical entropy codes must posses integer multiple lengths and therefore this acts as an asymptotic lower bound. The long term average bit rate generated from the trained SOM is written as:

$$B = \sum_{i=1}^{N} P_i |v(i)|$$

The rate-constraint is constructed from the trade-off between rate, (required for compression), and distortion (required for image quality). For low bit rate coding we wish to sacrifice image quality for higher compression, but a quantitative analysis in the given coding environment is required in order to make a prudent choice of an operational point. An approximate operational distortion-rate function, for a fixed vector dimension and a given vector quantiser, (c(x), y(c)), may be constructed as a lower bound from the distortion-rate theory underlying entropy-constrained vector quantisation [Chou P.A., Lookabaugh T., Gray R. M. *Entropy-Constrained Vector Quantization*. IEEE Transactions on Acoustics, Speech, and Signal Processing, Vol. 37, January 1983, pp. 31–42].

$$D^*(R) = \inf_{(c(x),y(c))} \{E[\|x-y\|^2] \mid E[R] \leq \log_2 N\}$$

Here E[ ] is the statistical expected operator of a stationary random process. This equation defines the bounds of the region in the distortion-rate plane within which we are able to operate with the parameter restrictions of our particular coding environment.

Consider the trained SOM where the neighbourhood function has decayed to zero and hence, assuming the high resolution case, the noise pdf, $\pi(n)$ is approximated by the Dirac function. The operational average distortion, $D^*$ is a minimum in the sense that it minimises the function:

$$D = E[\|x-y\|^2] = \int_{-\infty}^{+\infty} \|x-y\|^2 f(x) dx$$

The nearest-neighbor and centroid conditions result in an optimal partitioning of the SOM weight space into the regions, $R_i$. The rate constraint, B which is approximated by H(i) and introduced with a Lagrange multiplier, λ, to generate the operational distortion-rate function to be minimised.

$$D^*(R) = \sum_{i=1}^{N} P_i \int_{-\infty}^{+\infty} (\|x-y_i\|^2 - \lambda \log_2 P_i) f(x \mid x \in R_i) dx$$

The integral for the noise pdf, $\pi(n)$, has been omitted for simplicity of representation but is required for the training process as the neighbourhood function. Note that the $\lambda \log_2 P_i$ term is a constant and therefore affects the nearest-neighbour condition but does not affect the centroid condition. The rate-constrained SOM is trained with the gradient decent algorithm to minimise the instantaneous cost function described as:

$$J_\lambda \| = x - y_{i(x)} \|^2 - \lambda \log_2 P_{1}(x)$$

An approximation for the α posteriori $P_{1(x)}$ is made at each step of the descent algorithm.

A rate constrained SOM algorithm is now described. For the training process of the SOMs, that are used as vector quantisers, to be considered meaningful, an appropriate training set must be formed. The training set must represent the input space in the sense that its pdf is an approximation to pdf of the input space, which will be applied to the vector quantiser during normal operation. In a video coding environment where the difference images are quantised within a first order coding loop, the quantisation error will be propagated to the reference image. The error will be superimposed on the next difference image and will appear as an input to the vector quantiser. In this way quantisation errors will accumulate in time as subjectively annoying artefacts. This effect is exaggerated in low bit rate codecs where the number of neurons in the SOMs is restricted and the high resolution assumptions are not strictly valid. The problem may be reduced by dynamically adapting the training set during the training process.

The zero vectors are generally coded via some other mechanism (either a run-length approach or using a code/no code bit) and hence the training set consists only of non-zero difference vectors. The training set is formed from typical image differences and the addition of errors that the vector quantisers will make after training. However, knowledge of the final state of the quantisers is unknown during the training process, therefore error approximation is based on the current state. The applied training set is adapted at each iteration during the training process in the following manner. Two random samples, $x_1$ and $x_2$, are selected from the difference image training set, T, at iteration t.

$$\{x_1(t), x_2(t)\} \in T$$

The update process of the SOM is performed with the first sample, $x_1$. The error term, $e_1$, for this sample and the winning neuron weight vector, $c_j$, is determined. Simulating the effect of this error in the coding loop generates the second training sample, $x_e$, for the SOM. Therefore the training data, $T_t$, applied to the SOM at iteration t, may be described as:

$$T_t = \{x_1(t), x_e(t)\}$$

Here;

$$x_e(t) = x_2(t) - (x_1(t) - c_1(t))$$

The training process continues in this way with a difference image sample and an error adapted sample at each iteration. After initialising the SOM neuron weights with small random values and setting the occurrence frequency, $F_j$ to unity for each neuron, the training proceeds by repeating the steps 1 to 5 defined as follows:

Step 1: Randomly sample the training space to establish $\{x_1(t), x_2(t)\}$.

Step 2: Determine the first winning neuron, $i_1$:

$$i_1 = \min_j{}^{-1} \{\|x_1(t) - c_j(t)\|^2 - \lambda \log_2 P_j\}, j = 1 \ldots N$$

$$P_j = \frac{F_j}{\sum_{j=1}^{N} F_k}$$

Step 3: Update the neighbourhood neuron weight values and the winning neuron occurrence frequency:

$$c_j(t+1) = c_j(t) + \eta(t)\pi_{j,i_1}(t)[x_1(t) - c_j(t)], j = 1 \ldots N$$
$$F_{i_1} = F_{i_1} + 1$$

Here η(t) is the exponential decaying learning rate parameter and $\pi_{j,i1}(t)$ is the Guassian exponential neighbourhood function with a linearly decaying radius centred on the winning neuron, $i_1$.

Step 4: Determine $x_e(t)$ and find second winning neuron, $i_2$:

$$i_2 = \min_j{}^{-1} \{\|x_e(t) - c_j(t)\|^2 - \lambda \log_2 P_j\}, j = 1 \ldots N$$

Step 5: Update the second winning neuron weight values and occurrence frequency:

$$c_j(t+1) = c_j(t) + \eta(t)\pi_{j,i_2}(t)[x_e(t) - c_j(t)], j = 1 \ldots N$$
$$F_{i_2} = F_{i_2} + 1$$

The heuristics of constraint parameter selection are now described. For a DWT-domain video coding environment each DWT sub-band exhibits differing statistical properties and probability distributions therefore optimal rate-distortion selections are based on different criteria depending on the sub-band. The sub-band multidimensional probability distributions can not be assumed to be Gaussian nor are infinite resolution approximations necessarily applicable to finite size SOMs. The training set is a sample collection of the input space and therefore the underlying pdf is not smooth.

In practical implementations the choice of sub-band vector dimension is limited by the image size. For example, QCIF image sizes permit vector dimensions of 4×4, 2×2, 2×2 and 1×3 at sub-band levels of 1, 2, 3 and 4, respectively. Furthermore, the SOM dimensions are restricted by the need for practical variable length codes. SOM sizes of 8×8, 16×16, 32×32 and 64×64 neurons are considered practical. Operational rate-distortion points verses k plots are generated for all sub-bands and colour components and used to empirically select generic optimal points for constructing the vector quantisers.

Figure 9:
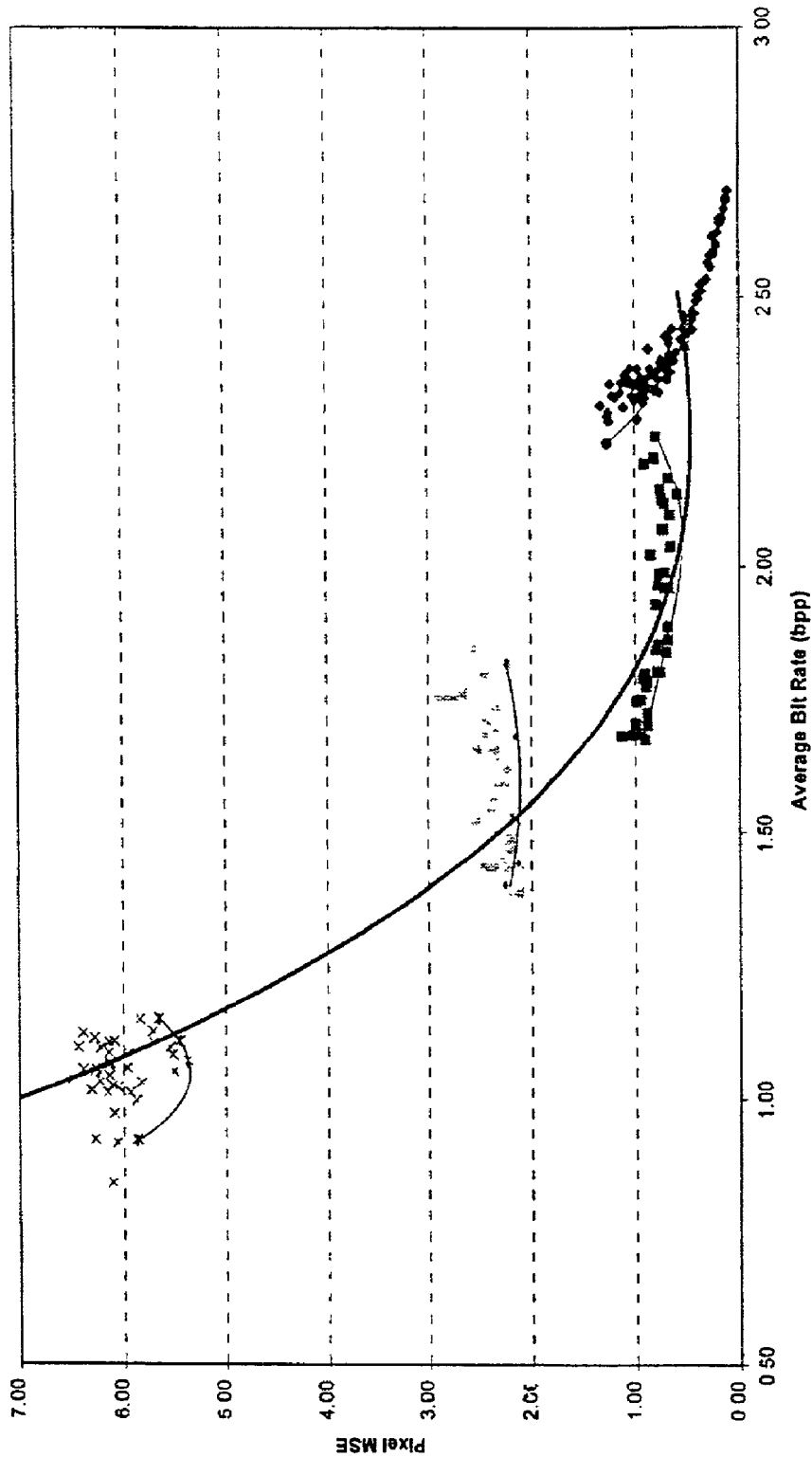
FIG. 9 is a graph representing distortion as a function of average bit rate, for different sizes of self organising neural maps as used by the embodiments of the invention.

Consider the results for the luminance, level 3 and L×Hy DWT sub-band at four different SOM sizes for a 2×2 dimensional vector, shown in FIG. 9.

The overall trendline shows the distortion-rate characteristic for the choice of SOM size. The characteristic could be described as a cost curve where the operating point is chosen depending on slope at that point. A low valued slope (>1.75 bpp in FIG. 9) implies a small distortion cost per coding bit. The large negative slope (<1.75 bpp) region implies a large bit cost for an improved distortion. From this line, the 32×32 SOM may be chosen as the most optimal under these operating parameters. However, for low bit rate coding the 16×16 SOM will give a gain of ~0.5 bpp for an average loss of ~1.0 pixel mean square error (MSE). In this way the operating point is chosen depending on the coding environment.

The thinner trendlines indicate the local convex hull for each SOM. The 64×64 neuron SOM has the typical non-increasing convex shape of high resolution smooth pdf vector quantisers. However, as the number of neurons of the SOM is decreased and therefore the further away from the high resolution assumptions the vector quantiser operates, two phenomena begin to appear. A clear operational minimum distortion point at a given λ, and multiple operating points for a given average bit rate appear. For the low resolution points it is conceivable that these phenomena may be attributed to a diminishing difference between the global minimum and the local minima for the now large 'volumes of influence' of each neuron in the SOM.

The selected 32×32 SOM shows that the locally optimal operating point is at a minimum. Each sub-band is analysed in the same way to produce an operational SOM size and Lagrange multiplier, λ.

Figure 10:
FIG. 10 is a first frame of a first sequence of video test images.
Figure 11:
FIG. 11 is a first frame of a second sequence of video test images.

Two video test sequences have been used to evaluate the basic embodiment of the method and the extended embodiment of the method. The test sequences are typical for video telephony environments, and are of the same subject at differing distances from the camera. The training difference images for the SOMs were not constructed from any of the test sequences and were taken from a different camera. The first images of the first test sequence is shown in FIG. 10, and the first image of the second test sequence is shown in FIG. 11.

The test sequences consist of colour images with 24 bits/pixel (bpp) (being 8 bits for red, green and blue components respectively) and with a QCIF pixel resolution (176×144 pixels). The frame rate is a constant 10 frames/s. For the purposes of comparison, the measure of output quality is considered from a peak signal to noise ratio (PSNR) perspective that is defined from the mean square error (MSE) between the original and the output images on a pixel-by-pixel basis for all colour components. For an input image, $I_i$, and a reconstructed output image, $I_O$, with pixel dimensions M×N and C colour components, the MSE is defined as:

$$MSE = \frac{1}{CMN} \sum_{c=1}^{C} \sum_{m=1}^{M} \sum_{n=1}^{N} (I_i(c, m, n) - I_o(c, m, n))^2$$

The PSNR is therefore defined as:

$$PSNR = 10\log\frac{255^2}{MSE} \ [dB]$$

For bit rate control a quality factor parameter was used to scale the DWT psychophysical model. An arbitrary quality factor range of q={0 . . . 31} was chosen for the psychophysical scaling, S, applied as a division factor for quantisation and a multiplier for inverse quantisation.

$$S = 1 + \frac{q}{4}$$

A threshold factor was applied to the difference image coefficients. The thresholding was applied in the following manner. If the absolute value of the coefficient was less than the threshold value then, it was set to zero. Otherwise, the threshold was subtracted from (added to) the positive (negative) coefficient. The purpose of the subtraction (addition) was to further 'encourage' small valued coefficient vectors.

The algorithm was applied with target bit rates of 10k bits/s, 28.8k bits/s and 64k bits/s with the quality and threshold factors set according to Table 3.

TABLE 3

Coding Quality and Threshold Parameters

| Test Sequence | Bit Rate (bits/s) | Quality Factor (q) | Threshold |
| --- | --- | --- | --- |
| First Sequence | 10k | 3 | 2 |
|  | 28.8k | 2 | 2 |
|  | 64k | 1 | 2 |
| Second Sequence | 10k | 3 | 2 |
|  | 28.8k | 1 | 2 |
|  | 64k | 1 | 1 |

Figure 12:
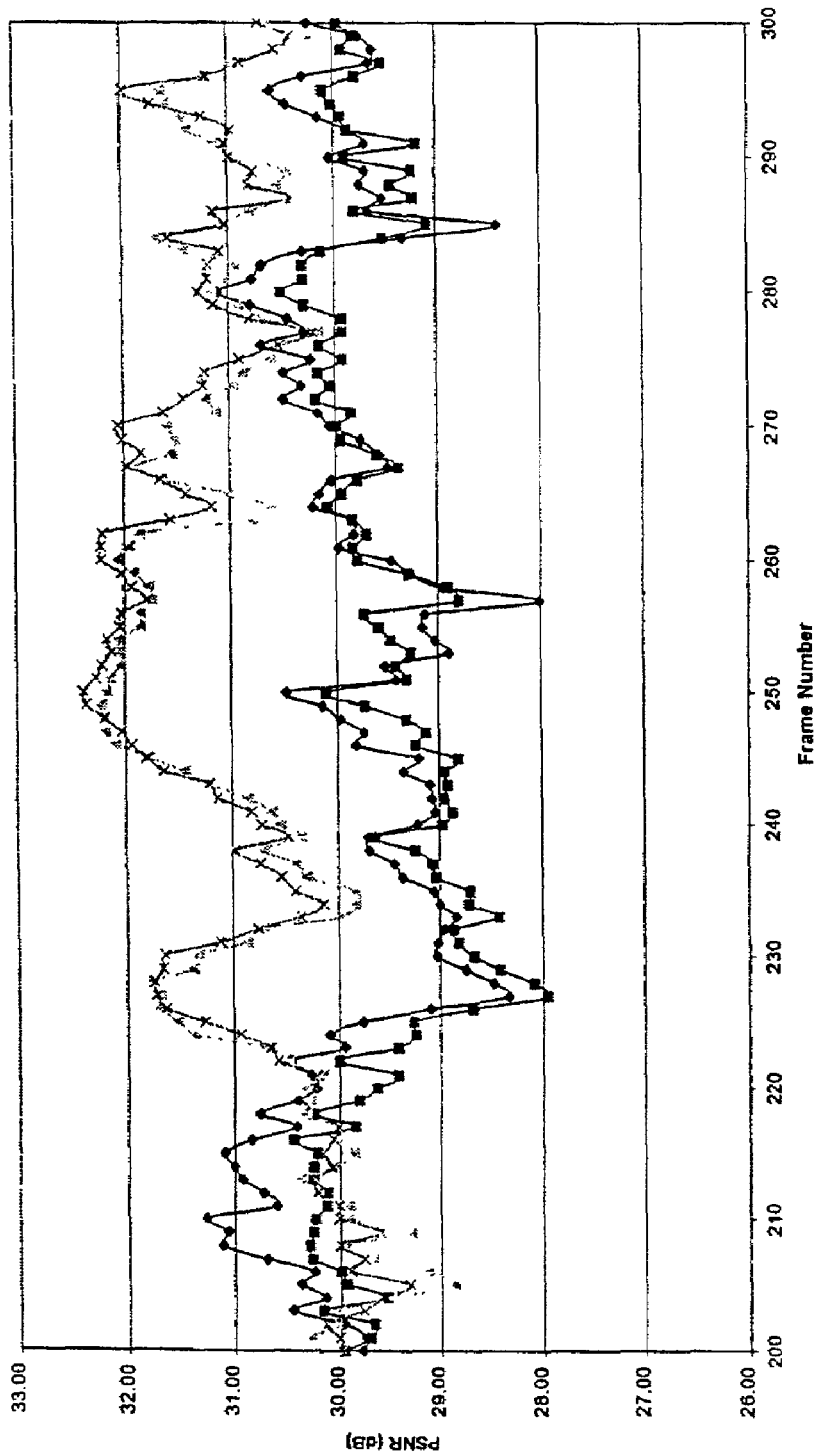
FIG. 12 is a graph showing the performance of the embodiments of the invention at 10 kbits/second.
Figure 13:
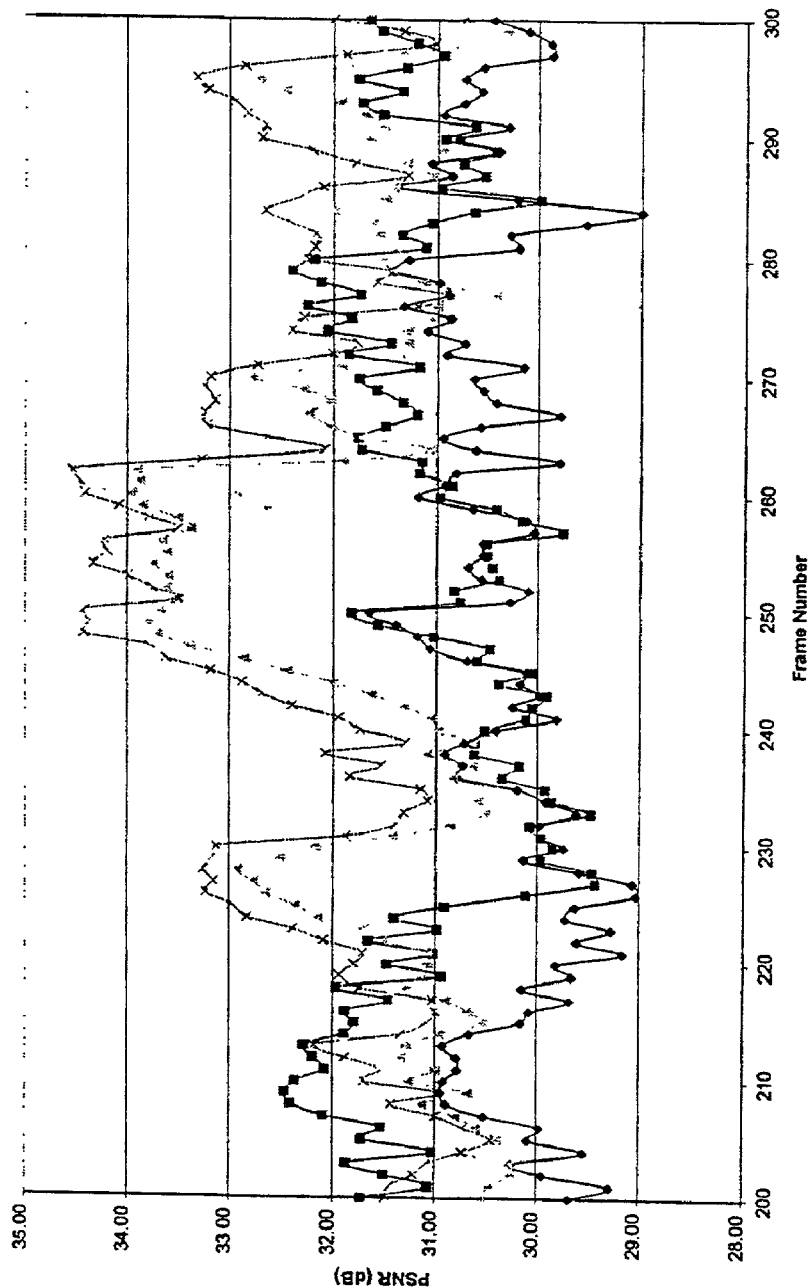
FIG. 13 is a graph showing the performance of the embodiments of the invention at 28.8 kbits/second.
Figure 14:
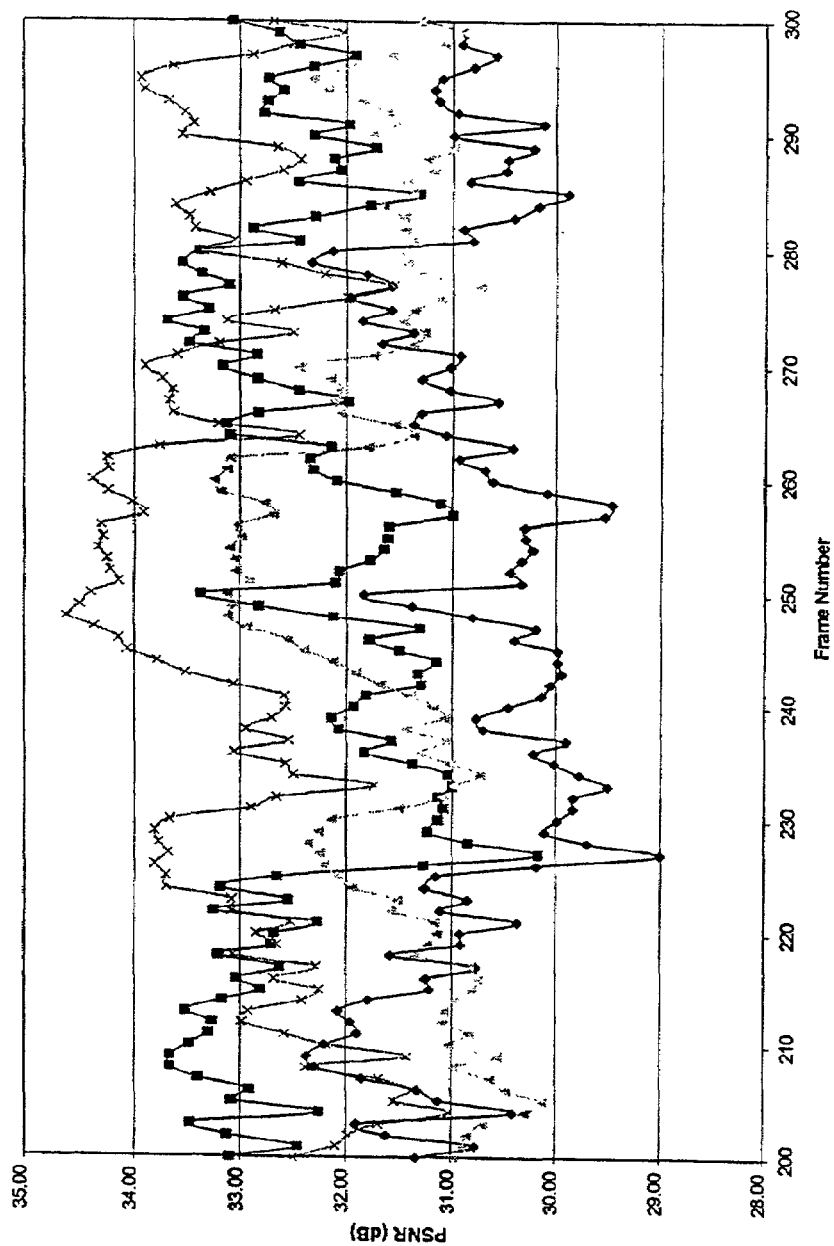
FIG. 14 is a graph showing the performance of the embodiments of the invention at 64 kbits/second.

A section of the distortion results from image frame numbers 200 to 300 for the two sequences, comparing the basic method and the extended motion compensated method, for 10k bits/s, 28.8k bits/s and 64k bits/s are shown in FIGS. 12, 13 and 14 respectively. The images were decomposed to 4 levels with the DWT but the motion compensation was performed only for levels 1 to 3.

The extended method generally outperforms the basic algorithm but with diminishing returns as the bit rate is decreased from 64k bits/s down to 10 kbits/s. The 64k bits/s case provides ~1.5 dB gain, the 28.8k bits/s case ~0.5 dB and approximately the same performance at 10k bits/s. The DWT domain motion estimation is more accurate in the high resolution sub-bands than at the low. At very low bit rates the constant frame bit constraint implies that it is likely that the foveated multiresolution coding order will not reach the higher resolutions. Therefore the contribution of the motion compensation to the gain becomes limited and considering that it only begins at DWT level 3. This is more apparent for scenes with higher temporal activity as in the first sequence where the basic method actually performs better. Here, the bit cost of coding the motion vectors outweighs their potential quality gain, although the difference is small.

Note that the sub-band vector quantisers are trained on and hence optimised for difference images that exclude motion compensation. Including motion compensated data in the training process should improve the performance of the extended method.

The effect of the constant frame bit constraint is apparent in the shape of the distortion shown in FIGS. 12 to 14, and is consistent at all bit rates. Any sudden temporal activity in the sequence results in a large negative slope of PSNR (see for example frames 230 to 235 of the second sequence). There is more energy in the difference information that requires coding, and this means that either more bits must be used and/or the quality must decrease (distortion-rate tradeoff). The constant bit constraint means that the quality is sacrificed. If the sudden temporal activity is followed by a period of low activity, the method will use this 'bit respite' to recover the quality of the coded image. This is indicated by positive PSNR slope following the decrease (see for example frames 236 to 250 of the second sequence). Note that the positive recovery slope is less than the negative quality degradation slope.

What is claimed is:

1. An image coding method comprising generating an ordered sequence of coded image data, the sequence beginning with coded data representative of an area of the image having high importance, and ending with coded data representative of an area of the image having lower importance, wherein the image is one of a sequence of images, the image is compared to a reference image determined using preceding images of the sequence and the coding method is used to code differences between the image and the reference image in a coding loop, wherein when an image is coded to a lower resolution than an immediately preceding image, on adding the image to the reference image, artefacts at high resolution in the reference image are removed by setting the higher resolution data to zero so that the resolution of the reference image corresponds to the resolution of the image that was coded, thereby allowing the amount of data which is used to represent the coded images to be increased or decreased, to adjust the amount of coded data to match an available bandwidth.

2. An image coding method according to claim 1, wherein the importance of the image areas represented by the coded data decreases gradually over the ordered sequence.

3. An image coding method according to claim 2, wherein the image data coding sequence is arranged in a substantially spiral configuration centred on the area of importance.

4. An image coding method according to claim 1, wherein the area of importance is at a location selected as the most likely centre point of foveated vision of a viewer of the image.

5. An image coding method according to claim 4, wherein the area of importance is at a centre point of the image.

6. An image coding method according to claim 1, wherein the method includes converting an image into a multi-resolution representation, different resolution representations of the image being coded in sequence, the order of the sequence being determined to reflect psychophysical aspects of human vision.

7. An image coding method according to claim 6, wherein according to the sequence a luminance representation of the image is coded before chrominance representations of the image.

8. An image coding method according to claim 7, wherein for a given level of resolution, the luminance representation is arranged to include more resolution than the chrominance representations.

9. An image coding method according to claim 6, wherein the multi-resolution representation is generated using a wavelet transform, and the coding sequence comprises wavelet representation of the image which increase from a low level of resolution to a high level of resolution.

10. An image coding method according to claim 9, wherein wavelet orientations of horizontal and vertical image components are coded before wavelet orientations of diagonal image components.

11. An image coding method according to claim 10, wherein wavelet orientations of diagonal image components of a given level of resolution are coded after wavelet orientations of horizontal and vertical image components of a higher resolution.

12. An image coding method according to claim 1, wherein the method is implemented as part of a communications system, and the amount of coded information output by the method for a given image is determined on an image by image basis in accordance with the available bandwidth of the communications system.

13. An image coding method according to claim 12, wherein where necessary in order to fully utilise the available bandwidth of the communications system includes a truncated sequence of coded image data, image data representative of areas of least importance having been excluded from the truncated sequence.

14. An image coding method according to claim 1, wherein a predetermined code is added to a sequence to indicate the end of image data representative of a particular aspect of the image.

15. An image coding method according to claim 1, wherein scalar quantisation is used to minimise the amount of image data to be coded, the scalar quantisation being based upon a psychophysical model.

16. An image coding method according to claim 1, wherein the method includes an estimation of motion within an image as compared with a reference image, and the estimated motion is included in the coded image data.

17. An image coding method according to claim 16, wherein the method includes a choice between image data that has been coded using motion estimation and data that has been coded without using motion estimation, the choice being made upon the basis of minimising distortion of the coded image.

18. An image coding method according to claim 1, wherein the method includes vector quantisation of the image, the vector quantisation being implemented using a self organising neural map to provide image data in the form of indices of a codebook.

19. An image coding method according to claim 9, wherein the method includes vector quantisation of the image, the vector quantisation being implemented using a self organising neural map to provide image data in the form of indices of a codebook.

20. An image coding method according to claim 19, wherein a threshold is applied to the magnitude of wavelet coefficients, and those which fall below the threshold are converted to zero coefficients.

21. An image coding method according to claim 19, wherein different codebooks are used for different sub-bands of the wavelet representation of the image.

22. An image coding method according to claim 18, wherein the indices of the codebook are subsequently coded using variable length entropy coding.

23. An image coding method according to claim 22, wherein a series of zero indices followed by a non-zero index is coded as a pair of values by the variable length entropy coding, a first value representing the number of zero indices in the series and the second value representing the value of the non-zero index.

24. An image coding method according to claim 22, wherein a threshold is applied to the indices of the codebook, and those indices which fall below the threshold are converted to zero indices.

25. An image coding method according to claim 24, wherein wavelet coefficients which fall above the threshold are reduced by the value of the threshold.

26. An image coding and decoding method comprising:
    generating an ordered sequence of coded image data, the sequence beginning with coded data representative of an area of the image having high importance, and ending with coded data representative of an area of the image having lower importance, wherein the image is one of a sequence of images, the image is compared to a reference image determined using preceding images of the sequence and the coding method is used to code differences between the image and the reference image in a coding loop; and subsequently decoding the coded data by adding the coded data to a reference image in a coding loop, wherein when a coded image has been coded to a lower resolution than an immediately preceding image, on adding the coded image to the reference image during decoding, artefacts at high resolution in the reference image are removed by setting the higher resolution data to zero so that the resolution of the reference image corresponds to the resolution of the coded image.

27. An image coding and decoding method according to claim 26, wherein the importance of the image areas represented by the coded data decreases gradually over the ordered sequence.

28. An image coding and decoding method according to claim 27, wherein the image data coding sequence is arranged in a substantially spiral configuration centred on the area of importance.

29. An image coding and decoding method according to claim 26, wherein the area of importance is at a location selected as the most likely centre point of foveated vision of a viewer of the image.

30. An image coding and decoding method according to claim 29, wherein the area of importance is at a centre point of the image.

31. An image coding and decoding method according to claim 26, wherein the method includes converting an image into a multi-resolution representation, different resolution representations of the image being coded in sequence, the order of the sequence being determined to reflect psychophysical aspects of human vision.

32. An image coding and decoding method according to claim 31, wherein according to the sequence a luminance representation of the image is coded before chrominance representations of the image.

33. An image coding and decoding method according to claim 32, wherein for a given level of resolution, the luminance representation is arranged to include more resolution than the chrominance representations.

34. An image coding and decoding method according to claim 31, wherein the multi-resolution representation is generated using a wavelet transform, and the coding sequence comprises wavelet representation of the image which increase from a low level of resolution to a high level of resolution.

35. An image coding and decoding method according to claim 34, wherein wavelet orientations of horizontal and vertical image components are coded before wavelet orientations of diagonal image components.

36. An image coding and decoding method according to claim 35, wherein wavelet orientations of diagonal image components of a given level of resolution are coded after wavelet orientations of horizontal and vertical image components of a higher resolution.

37. An image coding and decoding method according to claim 26, wherein the method is implemented as part of a communications system, and the amount of coded information output by the method for a given image is determined on an image by image basis in accordance with the available bandwidth of the communications system.

38. An image coding and decoding method according to claim 37, wherein where necessary in order to fully utilise the available bandwidth of the communications system includes a truncated sequence of coded image data, image data representative of areas of least importance having been excluded from the truncated sequence.

39. An image coding and decoding method according to claim 26, wherein a predetermined code is added to a sequence to indicate the end of image data representative of a particular aspect of the image.

40. An image coding and decoding method according to claim 26, wherein scalar quantisation is used to minimise the amount of image data to be coded, the scalar quantisation being based upon a psychophysical model.

41. An image coding and decoding method according to claim 26, wherein the method includes an estimation of motion within an image as compared with a reference image, and the estimated motion is included in the coded image data.

42. An image coding and decoding method according to claim 41, wherein the method includes a choice between image data that has been coded using motion estimation and data that has been coded without using motion estimation, the choice being made upon the basis of minimising distortion of the coded image.

43. An image coding and decoding method according to claim 26, wherein the method includes vector quantisation of the image, the vector quantisation being implemented using a self organising neural map to provide image data in the form of indices of a codebook.

44. An image coding and decoding method according to claim 34, wherein the method includes vector quantisation of the image, the vector quantisation being implemented using a self organising neural map to provide image data in the form of indices of a codebook.

45. An image coding and decoding method according to claim 44, wherein a threshold is applied to the magnitude of wavelet coefficients, and those which fall below the threshold are converted to zero coefficients.

46. An image coding and decoding method according to claim 44, wherein different codebooks are used for different sub-bands of the wavelet representation of the image.

47. An image coding and decoding method according to claim 43, wherein the indices of the codebook are subsequently coded using variable length entropy coding.

48. An image coding and decoding method according to claim 47, wherein a series of zero indices followed by a non-zero index is coded as a pair of values by the variable length entropy coding, a first value representing the number of zero indices in the series and the second value representing the value of the non-zero index.

49. An image coding and decoding method according to claim 47, wherein a threshold is applied to the indices of the codebook, and those indices which fall below the threshold are converted to zero indices.

50. An image coding and decoding method according to claim 49, wherein wavelet coefficients which fall above the threshold are reduced by the value of the threshold.

51. An image decoding method comprising decoding coded data by adding the coded data to a reference image in a coding loop, wherein when a coded image has been coded to a lower resolution than an immediately preceding image, on adding the coded image to the reference image during decoding, artefacts at high resolution in the reference image are removed by setting the higher resolution data to zero so that the resolution of the reference image corresponds to the resolution of the coded image.

52. An image decoding method according to claim 51, wherein the importance of the image areas represented by the coded data decreases gradually over the ordered sequence.

53. An image decoding method according to claim 52, wherein the image data coding sequence is arranged in a substantially spiral configuration centred on the area of importance.

54. An image decoding method according to claim 51, wherein the area of importance is at a location selected as the most likely centre point of foveated vision of a viewer of the image.

55. An image decoding method according to claim 54, wherein the area of importance is at a centre point of the image.

56. An image decoding method according to claim 51, wherein the method includes converting an image into a multi-resolution representation, different resolution representations of the image being coded in sequence, the order of the sequence being determined to reflect psychophysical aspects of human vision.

57. An image decoding method according to claim 56, wherein according to the sequence a luminance representation of the image is coded before chrominance representations of the image.

58. An image decoding method according to claim 57, wherein for a given level of resolution, the luminance representation is arranged to include more resolution than the chrominance representations.

59. An image decoding method according to claim 56, wherein the multi-resolution representation is generated using a wavelet transform, and the coding sequence comprises wavelet representation of the image which increase from a low level of resolution to a high level of resolution.

60. An image decoding method according to claim 59, wherein wavelet orientations of horizontal and vertical image components are coded before wavelet orientations of diagonal image components.

61. An image decoding method according to claim 60, wherein wavelet orientations of diagonal image components of a given level of resolution are coded after wavelet orientations of horizontal and vertical image components of a higher resolution.

62. An image decoding method according to claim 51, wherein the method is implemented as part of a communications system, and the amount of coded information output by the method for a given image is determined on an image by image basis in accordance with the available bandwidth of the communications system.

63. An image decoding method according to claim 62, wherein where necessary in order to fully utilise the available bandwidth of the communications system includes a truncated sequence of coded image data, image data representative of areas of least importance having been excluded from the truncated sequence.

64. An image decoding method according to claim 51, wherein a predetermined code is added to a sequence to indicate the end of image data representative of a particular aspect of the image.

65. An image decoding method according to claim 51, wherein scalar quantisation is used to minimise the amount of image data to be coded, the scalar quantisation being based upon a psychophysical model.

66. An image decoding method according to claim 51, wherein the method includes an estimation of motion within an image as compared with a reference image, and the estimated motion is included in the coded image data.

67. An image decoding method according to claim 66, wherein the method includes a choice between image data that has been coded using motion estimation and data that has been coded without using motion estimation, the choice being made upon the basis of minimising distortion of the coded image.

68. An image decoding method according to claim 51, wherein the method includes vector quantisation of the image, the vector quantisation being implemented using a self organising neural map to provide image data in the form of indices of a codebook.

69. An image decoding method according to claim 59, wherein the method includes vector quantisation of the image, the vector quantisation being implemented using a self organising neural map to provide image data in the form of indices of a codebook.

70. An image decoding method according to claim 69, wherein a threshold is applied to the magnitude of wavelet coefficients, and those which fall below the threshold are converted to zero coefficients.

71. An image decoding method according to claim 69, wherein different codebooks are used for different sub-bands of the wavelet representation of the image.

72. An image decoding method according to claim 68, wherein the indices of the codebook are subsequently coded using variable length entropy coding.

73. An image decoding method according to claim 72, wherein a series of zero indices followed by a non-zero index is coded as a pair of values by the variable length entropy coding, a first value representing the number of zero indices in the series and the second value representing the value of the non-zero index.

74. An image decoding method according to claim 72, wherein a threshold is applied to the indices of the codebook, and those indices which fall below the threshold are converted to zero indices.

75. An image decoding method according to claim 74, wherein wavelet coefficients which fall above the threshold are reduced by the value of the threshold.

* * * * *